US012643545B2

(12) United States Patent
Adiprasito et al.

(10) Patent No.: US 12,643,545 B2
(45) Date of Patent: Jun. 2, 2026

(54) VEHICLE CONTROL SYSTEM AND METHOD FOR INCREASING THE ATTENTIVENESS OF A DRIVER WHEN OPERATING A DRIVING FUNCTION

(71) Applicant: Bayerische Motoren Werke Aktiengesellschaft, Munich (DE)

(72) Inventors: Bartono Adiprasito, Tiefenbach (DE); Helena Dolinaj, Munich (DE); Maximilian Guenther, Munich (DE); Frank Herchet, Neufahrn b. Freising (DE); Martin Jaensch, Munich (DE); Markus Kraemer, Dachau (DE); Julius Schulz, Munich (DE); Muhammed Yildiz, Kirchseeon (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 67 days.

(21) Appl. No.: 18/031,231

(22) PCT Filed: Oct. 6, 2021

(86) PCT No.: PCT/EP2021/077578
§ 371 (c)(1),
(2) Date: Apr. 11, 2023

(87) PCT Pub. No.: WO2022/078841
PCT Pub. Date: Apr. 21, 2022

(65) Prior Publication Data
US 2023/0373491 A1 Nov. 23, 2023

(30) Foreign Application Priority Data
Oct. 12, 2020 (DE) ..................... 10 2020 126 687.1

(51) Int. Cl.
*B60W 30/18* (2012.01)
*B60W 50/00* (2006.01)
*B60W 60/00* (2020.01)

(52) U.S. Cl.
CPC .... *B60W 30/18154* (2013.01); *B60W 30/181* (2013.01); *B60W 30/18159* (2020.02);
(Continued)

(58) Field of Classification Search
CPC ......... B60W 30/18143; B60W 30/181; B60W 30/18159; B60W 60/001; B60W 2050/0067; B60W 2555/60
See application file for complete search history.

(56) References Cited

U.S. PATENT DOCUMENTS 6,385,539 B1   5/2002 Wilson et al.
7,535,344 B2   5/2009 Obradovich
(Continued)

FOREIGN PATENT DOCUMENTS

CN       107622683 A       1/2018
CN       107719129 A       2/2018
(Continued)

OTHER PUBLICATIONS

International Search Report (PCT/ISA/210) issued in PCT Application No. PCT/EP2021/077592 dated Jan. 12, 2022 with English translation (four (4) pages).
(Continued)

*Primary Examiner* — Khoi H Tran
*Assistant Examiner* — Tristan J Greiner
(74) *Attorney, Agent, or Firm* — Crowell & Moring LLP

(57) ABSTRACT
A vehicle control system provides a driving function for automated longitudinal control of a vehicle at a signaling unit, the driving function having an automated mode and a manual mode. The vehicle control system is designed to
(Continued)

consecutively detect a plurality of signaling units during travel of the vehicle. The vehicle control system is also designed to determine, for each of the plurality of signaling units and on the basis of data relating to the relevant signaling unit, whether the driving function can be operated in the automated mode or only in the manual mode at the relevant signaling unit. The vehicle control system is further designed to operate the driving function in the manual mode at at least one first signaling unit of the plurality of signaling units although it has been determined, on the basis of the data relating to the first signaling unit, that the first signaling unit can be operated in the automated mode.

14 Claims, 8 Drawing Sheets

(52) U.S. Cl.
CPC ... *B60W 60/001* (2020.02); *B60W 2050/0067* (2013.01); *B60W 2555/60* (2020.02)

(56) References Cited

U.S. PATENT DOCUMENTS

| | | | |
|---|---|---|---|
| 8,478,500 B1 | 7/2013 | Vahidi et al. | |
| 8,626,382 B2 | 1/2014 | Obradovich | |
| 9,043,071 B1 | 5/2015 | Lombrozo | |
| 9,092,695 B1 | 7/2015 | Ogale | |
| 9,663,111 B2 | 5/2017 | Kristinsson et al. | |
| 10,000,065 B1 | 6/2018 | Baker et al. | |
| 11,492,000 B2 | 11/2022 | Otaki et al. | |
| 11,679,769 B2 | 6/2023 | Nishimura et al. | |
| 2001/0034575 A1 | 10/2001 | Takenaga et al. | |
| 2004/0182620 A1 | 9/2004 | Dornhausen | |
| 2005/0105771 A1 | 5/2005 | Nagai et al. | |
| 2005/0203684 A1 | 9/2005 | Borgesson | |
| 2006/0152350 A1 | 7/2006 | Swoboda et al. | |
| 2008/0162010 A1 | 7/2008 | Klotz et al. | |
| 2010/0073194 A1 | 3/2010 | Ghazarian | |
| 2010/0114450 A1 | 5/2010 | Huang | |
| 2011/0109462 A1 | 5/2011 | Deng et al. | |
| 2011/0136620 A1 | 6/2011 | Gibson et al. | |
| 2011/0202203 A1* | 8/2011 | Johansson | G05D 1/0022 |
| | | | 701/2 |
| 2011/0254701 A1 | 10/2011 | Yamada | |
| 2012/0253619 A1 | 10/2012 | Jensen | |
| 2013/0245866 A1 | 9/2013 | Kuretake | |
| 2013/0253754 A1 | 9/2013 | Ferguson et al. | |
| 2014/0046509 A1 | 2/2014 | Otake | |
| 2014/0142798 A1 | 5/2014 | Guarnizo Martinez et al. | |
| 2014/0257637 A1 | 9/2014 | Sangameswaran et al. | |
| 2014/0277986 A1 | 9/2014 | Mahler et al. | |
| 2014/0303868 A1 | 10/2014 | Otake | |
| 2015/0019097 A1 | 1/2015 | Morisaki et al. | |
| 2015/0057905 A1 | 2/2015 | Niwa et al. | |
| 2015/0120175 A1 | 4/2015 | Vahidi et al. | |
| 2015/0151725 A1 | 6/2015 | Clarke et al. | |
| 2015/0158491 A1 | 6/2015 | Suzuki et al. | |
| 2015/0232026 A1 | 8/2015 | Lueke et al. | |
| 2015/0360692 A1 | 12/2015 | Ferguson et al. | |
| 2016/0046293 A1 | 2/2016 | Inatsuka et al. | |
| 2016/0250968 A1 | 9/2016 | Shirakata et al. | |
| 2016/0318490 A1* | 11/2016 | Ben Shalom | B60T 7/22 |
| 2016/0328975 A1 | 11/2016 | Tokita | |
| 2017/0010612 A1 | 1/2017 | Asakura et al. | |
| 2017/0154528 A1 | 6/2017 | Moritani et al. | |
| 2017/0166122 A1 | 6/2017 | Ando et al. | |
| 2017/0262709 A1 | 9/2017 | Wellington et al. | |
| 2017/0305435 A1 | 10/2017 | Verheijen et al. | |
| 2017/0350713 A1 | 12/2017 | Bhatia et al. | |
| 2017/0355375 A1 | 12/2017 | Ferguson et al. | |
| 2017/0361841 A1 | 12/2017 | Kojo | |
| 2018/0018789 A1 | 1/2018 | Lenor et al. | |

| | | | |
|---|---|---|---|
| 2018/0043896 A1 | 2/2018 | Lee et al. | |
| 2018/0057001 A1 | 3/2018 | Hu et al. | |
| 2018/0061232 A1 | 3/2018 | Madigan et al. | |
| 2018/0072315 A1 | 3/2018 | Enthaler et al. | |
| 2018/0112997 A1* | 4/2018 | Fasola | G01C 21/3691 |
| 2018/0162409 A1 | 6/2018 | Altmannshofer et al. | |
| 2018/0178795 A1 | 6/2018 | Takada et al. | |
| 2018/0178796 A1 | 6/2018 | Fukuda et al. | |
| 2018/0201266 A1 | 7/2018 | Dodo | |
| 2018/0208203 A1 | 7/2018 | Gordon et al. | |
| 2018/0222480 A1 | 8/2018 | Shokonji | |
| 2018/0237011 A1 | 8/2018 | Laurent | |
| 2018/0237027 A1* | 8/2018 | Lundsgaard | B60W 50/0098 |
| 2018/0257682 A1* | 9/2018 | Brooks | B61L 15/0058 |
| 2018/0273047 A1 | 9/2018 | Wang | |
| 2018/0285664 A1 | 10/2018 | Satyakumar et al. | |
| 2018/0299893 A1 | 10/2018 | Qin et al. | |
| 2018/0319400 A1 | 11/2018 | Kleinau et al. | |
| 2018/0326968 A1 | 11/2018 | Geller et al. | |
| 2018/0345948 A1 | 12/2018 | Ulrich et al. | |
| 2018/0370542 A1 | 12/2018 | Braunagel et al. | |
| 2019/0016340 A1 | 1/2019 | Bae et al. | |
| 2019/0031163 A1 | 1/2019 | Adachi et al. | |
| 2019/0035276 A1 | 1/2019 | Zruya et al. | |
| 2019/0130198 A1 | 5/2019 | Hayashi | |
| 2019/0139407 A1 | 5/2019 | Huang et al. | |
| 2019/0210604 A1 | 7/2019 | Limbacher | |
| 2019/0210617 A1* | 7/2019 | Langbein | B60W 50/14 |
| 2019/0243371 A1 | 8/2019 | Nister et al. | |
| 2019/0278273 A1 | 9/2019 | Behrendt et al. | |
| 2019/0286141 A1 | 9/2019 | Miura et al. | |
| 2019/0286454 A1 | 9/2019 | Sano | |
| 2019/0291728 A1* | 9/2019 | Shalev-Shwartz | B60W 30/09 |
| 2019/0291733 A1 | 9/2019 | Limbacher et al. | |
| 2019/0329791 A1 | 10/2019 | Oba | |
| 2019/0332902 A1 | 10/2019 | Gallagher et al. | |
| 2019/0337508 A1* | 11/2019 | Foltin | B60W 40/09 |
| 2019/0355245 A1 | 11/2019 | Gigengack et al. | |
| 2019/0359227 A1 | 11/2019 | Otaki et al. | |
| 2019/0369623 A1 | 12/2019 | Sadakiyo et al. | |
| 2019/0389465 A1 | 12/2019 | Ogino et al. | |
| 2020/0004243 A1* | 1/2020 | Wiesenberg | B60W 30/18154 |
| 2020/0143674 A1 | 5/2020 | Woelfl | |
| 2020/0156641 A1 | 5/2020 | Kretschmann et al. | |
| 2020/0174471 A1* | 6/2020 | Du | G05D 1/0088 |
| 2020/0180610 A1 | 6/2020 | Schneider et al. | |
| 2020/0192398 A1 | 6/2020 | Xu et al. | |
| 2020/0208736 A1 | 7/2020 | Fujii et al. | |
| 2020/0209851 A1 | 7/2020 | Iwamoto et al. | |
| 2020/0233427 A1 | 7/2020 | Fukuoka et al. | |
| 2020/0240342 A1 | 7/2020 | Miyagawa | |
| 2020/0247211 A1 | 8/2020 | Devendran et al. | |
| 2020/0255011 A1 | 8/2020 | Sato | |
| 2020/0255014 A1 | 8/2020 | Meroux et al. | |
| 2020/0256460 A1 | 8/2020 | Naito et al. | |
| 2020/0265250 A1 | 8/2020 | Oe et al. | |
| 2020/0290613 A1 | 9/2020 | Trainor et al. | |
| 2020/0298890 A1 | 9/2020 | Miyagawa | |
| 2020/0312127 A1 | 10/2020 | Doemling et al. | |
| 2020/0339160 A1 | 10/2020 | Rosenbaum | |
| 2020/0361488 A1 | 11/2020 | Miura | |
| 2020/0370894 A1 | 11/2020 | Kim et al. | |
| 2020/0410263 A1* | 12/2020 | Gao | G01S 17/931 |
| 2021/0001879 A1 | 1/2021 | Adiprasito et al. | |
| 2021/0039648 A1 | 2/2021 | Ferguson et al. | |
| 2021/0039663 A1 | 2/2021 | Gohlke et al. | |
| 2021/0061309 A1 | 3/2021 | Kawanai | |
| 2021/0061312 A1 | 3/2021 | Wang | |
| 2021/0108926 A1 | 4/2021 | Tran | |
| 2021/0139020 A1 | 5/2021 | Ikezawa et al. | |
| 2021/0171032 A1 | 6/2021 | Ito et al. | |
| 2021/0171036 A1 | 6/2021 | Kohlhuber | |
| 2021/0179106 A1 | 6/2021 | Kim | |
| 2021/0182576 A1 | 6/2021 | Kuriyama | |
| 2021/0188268 A1 | 6/2021 | Goto et al. | |
| 2021/0188323 A1 | 6/2021 | Kohlhuber | |
| 2021/0253130 A1 | 8/2021 | Kumar et al. | |
| 2021/0261149 A1 | 8/2021 | Doi | |
| 2021/0316750 A1 | 10/2021 | Jo | |

(56) References Cited

U.S. PATENT DOCUMENTS

| | | |
|---|---|---|
| 2021/0401340 A1 | 12/2021 | Gallagher et al. |
| 2022/0048507 A1 | 2/2022 | Grewal et al. |
| 2022/0063652 A1 | 3/2022 | Taylor et al. |
| 2022/0080969 A1 | 3/2022 | Fischer et al. |
| 2022/0105925 A1 | 4/2022 | Naserian et al. |
| 2022/0219689 A1 | 7/2022 | Chang et al. |
| 2023/0136138 A1 | 5/2023 | Otaki et al. |
| 2023/0141328 A1 | 5/2023 | Nishimoto et al. |
| 2023/0202474 A1 | 6/2023 | Lee |
| 2023/0339469 A1 | 10/2023 | Ferguson et al. |
| 2023/0373505 A1 | 11/2023 | Adiprasito et al. |
| 2023/0382377 A1 | 11/2023 | Adiprasito et al. |
| 2023/0382417 A1 | 11/2023 | Adiprasito et al. |
| 2023/0406314 A1 | 12/2023 | Adiprasito et al. |
| 2024/0217510 A1 | 7/2024 | Gutmann et al. |

FOREIGN PATENT DOCUMENTS

| | | | | |
|---|---|---|---|---|
| CN | 109476313 A | 3/2019 | | |
| CN | 111699122 A | 9/2020 | | |
| DE | 100 41 277 A1 | 5/2001 | | |
| DE | 103 12 386 A1 | 9/2004 | | |
| DE | 601 06 794 T2 | 11/2005 | | |
| DE | 10 2004 028 614 A1 | 12/2005 | | |
| DE | 10 2005 002 504 A1 | 7/2006 | | |
| DE | 10 2006 017 177 A1 | 10/2007 | | |
| DE | 10 2008 060 869 A1 | 6/2009 | | |
| DE | 10 2008 061 303 A1 | 6/2009 | | |
| DE | 10 2007 062 698 A1 | 7/2009 | | |
| DE | 10 2010 027 899 A1 | 10/2011 | | |
| DE | 10 2010 063 006 A1 | 6/2012 | | |
| DE | 10 2012 017 526 A1 | 3/2013 | | |
| DE | 10 2012 002 236 A1 | 8/2013 | | |
| DE | 10 2013 003 565 A1 | 9/2013 | | |
| DE | 10 2013 104 533 A1 | 11/2013 | | |
| DE | 10 2012 016 772 A1 | 2/2014 | | |
| DE | 10 2013 226 004 A1 | 6/2014 | | |
| DE | 10 2013 001 017 A1 | 7/2014 | | |
| DE | 10 2013 209 064 A1 | 11/2014 | | |
| DE | 10 2013 226 599 A1 | 6/2015 | | |
| DE | 10 2014 201 132 A1 | 7/2015 | | |
| DE | 10 2014 205 953 A1 | 10/2015 | | |
| DE | 10 2015 204 122 A1 | 11/2015 | | |
| DE | 10 2014 216 272 A1 | 2/2016 | | |
| DE | 10 2015 205 371 A1 | 9/2016 | | |
| DE | 10 2015 004 550 A1 | 10/2016 | | |
| DE | 10 2015 005 364 A1 | 10/2016 | | |
| DE | 10 2015 207 023 A1 | 10/2016 | | |
| DE | 10 2015 209 671 A1 | 12/2016 | | |
| DE | 10 2015 211 126 A1 | 12/2016 | | |
| DE | 10 2015 214 622 A1 | 2/2017 | | |
| DE | 10 2015 218 196 A1 | 3/2017 | | |
| DE | 10 2015 222 805 A1 | 5/2017 | | |
| DE | 10 2016 007 187 A1 | 6/2017 | | |
| DE | 102015226442 A1 * | 6/2017 | ............ | B60W 50/08 |
| DE | 10 2016 205 508 A1 | 8/2017 | | |
| DE | 10 2016 208 793 A1 | 11/2017 | | |
| DE | 10 2017 002 237 A1 | 11/2017 | | |
| DE | 10 2016 008 363 A1 | 1/2018 | | |
| DE | 10 2016 213 059 A1 | 1/2018 | | |
| DE | 10 2016 115 071 A | 2/2018 | | |
| DE | 10 2017 214 573 A1 | 3/2018 | | |
| DE | 10 2017 203 654 A1 | 9/2018 | | |
| DE | 10 2017 206 343 A1 | 10/2018 | | |
| DE | 10 2017 208 646 A1 | 11/2018 | | |
| DE | 10 2017 208 878 A1 | 11/2018 | | |
| DE | 10 2017 219 127 A1 | 4/2019 | | |
| DE | 10 2018 132 981 A1 | 6/2019 | | |
| DE | 10 2019 000 497 A1 | 6/2019 | | |
| DE | 10 2018 202 146 A1 | 8/2019 | | |
| DE | 10 2018 203 353 A1 | 9/2019 | | |
| DE | 10 2018 205 753 A1 | 10/2019 | | |
| DE | 11 2018 000 443 T5 | 10/2019 | | |
| DE | 10 2018 207 301 A1 | 11/2019 | | |
| DE | 10 2018 115 551 A1 | 1/2020 | | |
| DE | 10 2019 004 818 A1 | 1/2020 | | |
| DE | 10 2018 129 801 A1 | 5/2020 | | |
| DE | 10 2018 129 804 A1 | 5/2020 | | |
| DE | 10 2018 131 280 A1 | 6/2020 | | |
| DE | 10 2018 131 466 A1 | 6/2020 | | |
| DE | 10 2019 131 739 A1 | 7/2020 | | |
| DE | 10 2019 104 778 A1 | 8/2020 | | |
| DE | 10 2019 203 369 A1 | 9/2020 | | |
| DE | 10 2019 206 748 A1 | 11/2020 | | |
| DE | 10 2020 122 399 A1 | 3/2021 | | |
| DE | 11 2019 009 433 T5 | 4/2021 | | |
| DE | 10 2020 112 615 A1 | 11/2021 | | |
| EP | 1 772 339 A1 | 4/2007 | | |
| EP | 2 650 857 A1 | 10/2013 | | |
| EP | 3 018 031 A2 | 5/2016 | | |
| EP | 3 281 833 A1 | 2/2018 | | |
| EP | 3 299 239 A1 | 3/2018 | | |
| EP | 3 546 309 A1 | 10/2019 | | |
| GB | 2486559 A | 6/2012 | | |
| JP | 2003-141697 A | 5/2003 | | |
| JP | 2007-263737 A | 10/2007 | | |
| JP | 2011-192177 A | 9/2011 | | |
| JP | 2011-245984 A | 12/2011 | | |
| JP | 2013-184664 A | 9/2013 | | |
| JP | 2014-32544 A | 2/2014 | | |
| JP | 2015-41241 A | 3/2015 | | |
| JP | 2016-40644 A | 3/2016 | | |
| JP | 2016-162015 A | 9/2016 | | |
| JP | 2017-97684 A | 6/2017 | | |
| JP | 2019-172253 A | 10/2019 | | |
| JP | 2020-50204 A | 4/2020 | | |
| JP | 2020-52625 A | 4/2020 | | |
| JP | 2020-121612 A | 8/2020 | | |
| KR | 10-2019-0007287 A | 1/2019 | | |
| KR | 10-2024-0155125 A | 10/2024 | | |
| WO | WO 2012/105896 A1 | 8/2012 | | |
| WO | WO 2014/053134 A1 | 4/2014 | | |
| WO | 2014/201581 A1 | 12/2014 | | |
| WO | WO 2018/195150 A1 | 10/2018 | | |
| WO | WO 2019/079941 A1 | 5/2019 | | |
| WO | WO 2019/135537 A1 | 7/2019 | | |
| WO | WO 2019/146052 A1 | 8/2019 | | |
| WO | WO 2019/159214 A1 | 8/2019 | | |
| WO | WO 2020/008225 A1 | 1/2020 | | |
| WO | WO 2020/181421 A1 | 9/2020 | | |
| WO | 2023/247355 A1 | 12/2023 | | |

OTHER PUBLICATIONS

German-language Written Opinion (PCT/ISA/237) issued in PCT Application No. PCT/EP2021/077592 dated Jan. 12, 2022 (six (6) pages).

German-language Search Report issued in German Application No. 10 2020 126 671.5 dated Jun. 16, 2021 with partial English translation (10 pages).

International Search Report (PCT/ISA/210) issued in PCT Application No. PCT/EP2021/077593 dated Jan. 12, 2022 with English translation (five (5) pages).

German-language Written Opinion (PCT/ISA/237) issued in PCT Application No. PCT/EP2021/077593 dated Jan. 12, 2022 (six (6) pages).

German-language Search Report issued in German Application No. 10 2020 126 670.7 dated Jun. 11, 2021 with partial English translation (12 pages).

International Search Report (PCT/ISA/210) issued in PCT Application No. PCT/EP2021/077586 dated Jan. 27, 2022 with English translation (four (4) pages).

German-language Written Opinion (PCT/ISA/237) issued in PCT Application No. PCT/EP2021/077586 dated Jan. 27, 2022 (six (6) pages).

German-language Search Report issued in German Application No. 10 2020 126 678.2 dated Jun. 14, 2021 with partial English translation (12 pages).

International Search Report (PCT/ISA/210) issued in PCT Application No. PCT/EP2021/077584 dated Jan. 4, 2022 with English translation (five (5) pages).

(56)                References Cited

OTHER PUBLICATIONS

German-language Written Opinion (PCT/ISA/237) issued in PCT Application No. PCT/EP2021/077584 dated Jan. 4, 2022 (seven (7) pages).
German-language Search Report issued in German Application No. 10 2020 126 680.4 dated Apr. 30, 2021 with partial English translation (12 pages).
International Search Report (PCT/ISA/210) issued in PCT Application No. PCT/EP2021/077591 dated Dec. 23, 2021 with English translation (four (4) pages).
German-language Written Opinion (PCT/ISA/237) issued in PCT Application No. PCT/EP2021/077591 dated Dec. 23, 2021 (six (6) pages).
German-language Search Report issued in German Application No. 10 2020 126 672.3 dated Apr. 26, 2021 with partial English translation (12 pages).
"Rechtsfolgen zunehmender Fahrzeugautomatisierung", Bundesanstalt fuer Strassenwesen (BASt) [German Federal Highway Research Institute], Forschung kompakt [Research News] , Edition Nov. 2012 with English Abstract (two (2) pages).
"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).
International Search Report (PCT/ISA/210) issued in PCT Application No. PCT/EP2021/077590 dated Jan. 7, 2022 with English translation (four (4) pages).
German-language Written Opinion (PCT/ISA/237) issued in PCT Application No. PCT/EP2021/077590 dated Jan. 7, 2022 (six (6) pages).
German-language Search Report issued in German Application No. 10 2020 126 675.8 dated Jul. 20, 2021 with partial English translation (12 pages).
International Search Report (PCT/ISA/210) issued in PCT Application No. PCT/EP2021/077587 dated Jan. 4, 2022 with English translation (four (4) pages).
German-language Written Opinion (PCT/ISA/237) issued in PCT Application No. PCT/EP2021/077587 dated Jan. 4, 2022 (seven (7) pages).
German-language Search Report issued in German Application No. 10 2020 126 677.4 dated Jul. 20, 2021 with partial English translation (12 pages).
International Search Report (PCT/ISA/210) issued in PCT Application No. PCT/EP2021/077585 dated Feb. 4, 2022 with English translation (five (5) pages).
German-language Written Opinion (PCT/ISA/237) issued in PCT Application No. PCT/EP2021/077585 dated Feb. 4, 2022 (six (6) pages).
German-language Search Report issued in German Application No. 10 2020 126 679.0 dated Jun. 24, 2021 with partial English translation (12 pages).
International Search Report (PCT/ISA/210) issued in PCT Application No. PCT/EP2021/077583 dated Jan. 4, 2022 with English translation (six (6) pages).
German-language Written Opinion (PCT/ISA/237) issued in PCT Application No. PCT/EP2021/077583 dated Jan. 4, 2022 (seven (7) pages).
German-language Search Report issued in German Application No. 10 2020 126 681.2 dated Jun. 29, 2021 with partial English translation (12 pages).
International Search Report (PCT/ISA/210) issued in PCT Application No. PCT/EP2021/077589 dated Jan. 7, 2022 with English translation (five (5) pages).
German-language Written Opinion (PCT/ISA/237) issued in PCT Application No. PCT/EP2021/077589 dated Jan. 7, 2022 (six (6) pages).
German-language Search Report issued in German Application No. 10 2020 126 673.1 dated Apr. 16, 2021 with partial English translation (13 pages).
International Search Report (PCT/ISA/210) issued in PCT Application No. PCT/EP2021/077582 dated Jan. 12, 2022 with English translation (four (4) pages).
German-language Written Opinion (PCT/ISA/237) issued in PCT Application No. PCT/EP2021/077582 dated Jan. 12, 2022 (six (6) pages).
German-language Search Report issued in German Application No. 10 2020 126 682.0 dated Jul. 12, 2021 with partial English translation (13 pages).
International Search Report (PCT/ISA/210) issued in PCT Application No. PCT/EP2021/077580 dated Jan. 19, 2022 with English translation (four (4) pages).
German-language Written Opinion (PCT/ISA/237) issued in PCT Application No. PCT/EP2021/077580 dated Jan. 19, 2022 (six (6) pages).
German-language Search Report issued in German Application No. 10 2020 126 685.5 dated Jul. 15, 2021 with partial English translation (12 pages).
International Search Report (PCT/ISA/210) issued in PCT Application No. PCT/EP2021/077579 dated Jan. 4, 2022 with English translation (four (4) pages).
German-language Written Opinion (PCT/ISA/237) issued in PCT Application No. PCT/EP2021/077579 dated Jan. 4, 2022 (six (6) pages).
German-language Search Report issued in German Application No. 10 2020 126 686.3 dated Jul. 16, 2021 with partial English translation (12 pages).
International Search Report (PCT/ISA/210) issued in PCT Application No. PCT/EP2021/077578 dated Dec. 23, 2021 with English translation (five (5) pages).
German-language Written Opinion (PCT/ISA/237) issued in PCT Application No. PCT/EP2021/077578 dated Dec. 23, 2021 (six (6) pages).
German-language Search Report issued in German Application No. 10 2020 126 687.1 dated Jun. 18, 2021 with partial English translation (10 pages).
International Search Report (PCT/ISA/210) issued in PCT Application No. PCT/EP2021/077588 dated Jan. 5, 2022 with English translation (four (4) pages).
German-language Written Opinion (PCT/ISA/237) issued in PCT Application No. PCT/EP2021/077588 dated Jan. 5, 2022 (seven (7) pages).
German-language Search Report issued in German Application No. 10 2020 126 676.6 dated Mar. 5, 2021 with partial English translation (12 pages).
U.S. Non-Final Office Action issued in U.S. Appl. No. 18/031,190 dated Jan. 28, 2025 (14 pages).
U.S. Non-Final Office Action issued in U.S. Appl. No. 18/031,194 dated Nov. 20, 2024 (23 pages).
U.S. Non-Final Office Action issued in U.S. Appl. No. 18/031,199 dated Dec. 16, 2024 (25 pages).
U.S. Non-Final Office Action issued in U.S. Appl. No. 18/031,182 dated Nov. 19, 2024 (15 pages).
U.S. Final Office Action issued in U.S. Appl. No. 18/031,182 dated Jan. 13, 2025 (14 pages).
U.S. Non-Final Office Action issued in U.S. Appl. No. 18/031,181 dated Dec. 16, 2024 (35 pages).
U.S. Non-Final Office Action issued in U.S. Appl. No. 18/031,224 dated Dec. 4, 2024 (24 pages).
U.S. Non-Final Office Action issued in U.S. Appl. No. 18/031,244 dated Dec. 10, 2024 (17 pages).
U.S. Non-Final Office Action issued in U.S. Appl. No. 18/031,186 dated Feb. 12, 2025 (26 pages).
U.S. Non-Final Office Action issued in U.S. Appl. No. 18/031,179 dated Mar. 20, 2025 (8 pages).
U.S. Non-Final Office Action issued in U.S. Appl. No. 18/031,216 dated Mar. 26, 2025 (20 pages).
Korean-language Office Action issued in Korean Application No. 10-2023-7010136 dated Dec. 16, 2024 with English Translation (10 pages).
U.S. Non-Final Office Action issued in U.S. Appl. No. 18/031,184 dated Feb. 26, 2025 (23 pages).

(56) References Cited

OTHER PUBLICATIONS

U.S. Notice of Allowance issued in U.S. Appl. No. 18/031,192 dated Feb. 26, 2025 (10 pages).

U.S. Non-Final Office Action issued in U.S. Appl. No. 18/031,180 dated Mar. 5, 2025 (29 pages).

U.S. Notice of Allowance issued in U.S. Appl. No. 18/031,194 dated Apr. 9, 2025 (12 pages).

U.S. Non-Final Office Action issued in U.S. Appl. No. 18/031,182 dated Apr. 28, 2025 (17 pages).

Korean-language Office Action issued in Korean Application No. 10-2023-7010873 dated May 13, 2025 with English Translation (12 pages).

Chinese-language Office Action issued in Chinese Application No. 202180069309.4 dated Jul. 24, 2025 with partial English translation (20 pages).

Chinese-language Office Action issued in Chinese Application No. 202180068871.5 dated Jun. 27, 2025 with partial English translation (16 pages).

Korean-language Office Action issued in Korean Application No. 10-2023-7011587 dated Jul. 7, 2025 with English translation (10 pages).

* cited by examiner

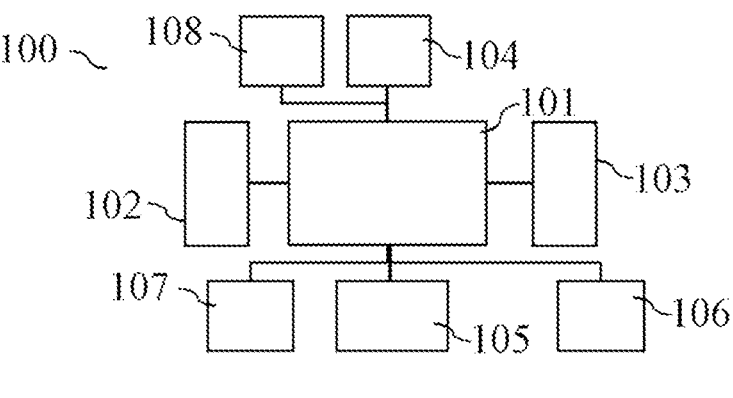
Fig. 1
Fig. 2a
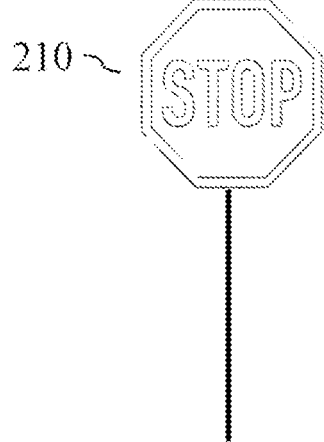
Fig. 2b

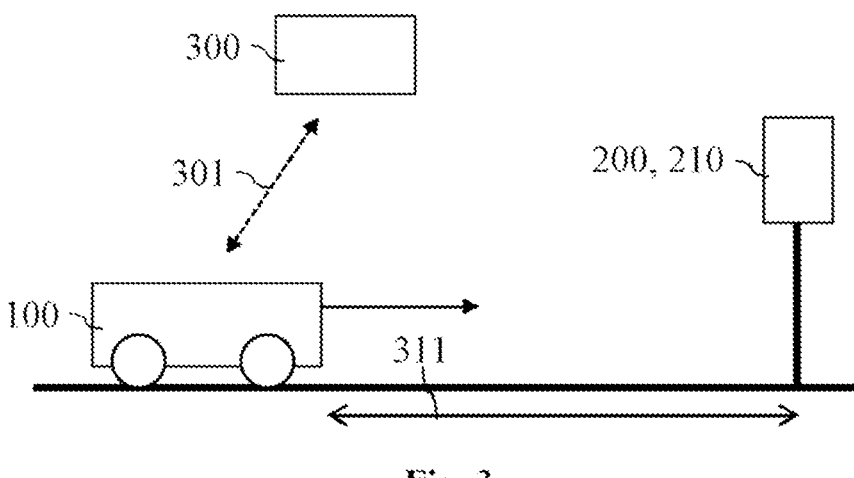
Fig. 3
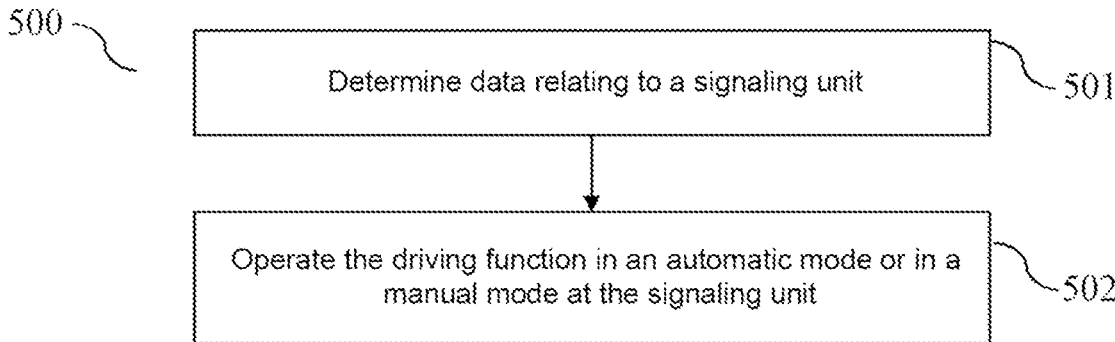
Fig. 4
500
| Determine data relating to a signaling unit | 501 |
↓
| Operate the driving function in an automatic mode or in a manual mode at the signaling unit | 502 |
Fig. 5a

510

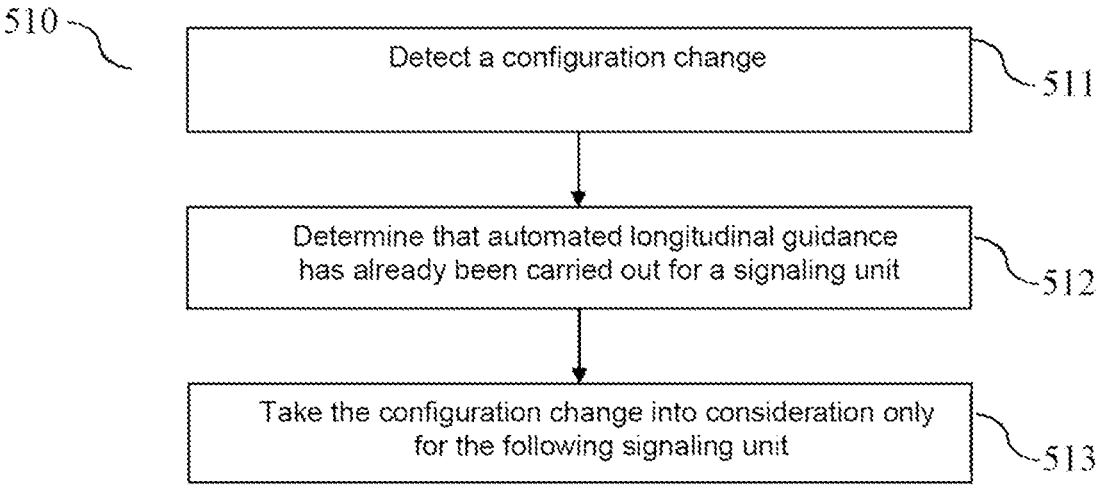

Detect a configuration change — 511

Determine that automated longitudinal guidance has already been carried out for a signaling unit — 512

Take the configuration change into consideration only for the following signaling unit — 513

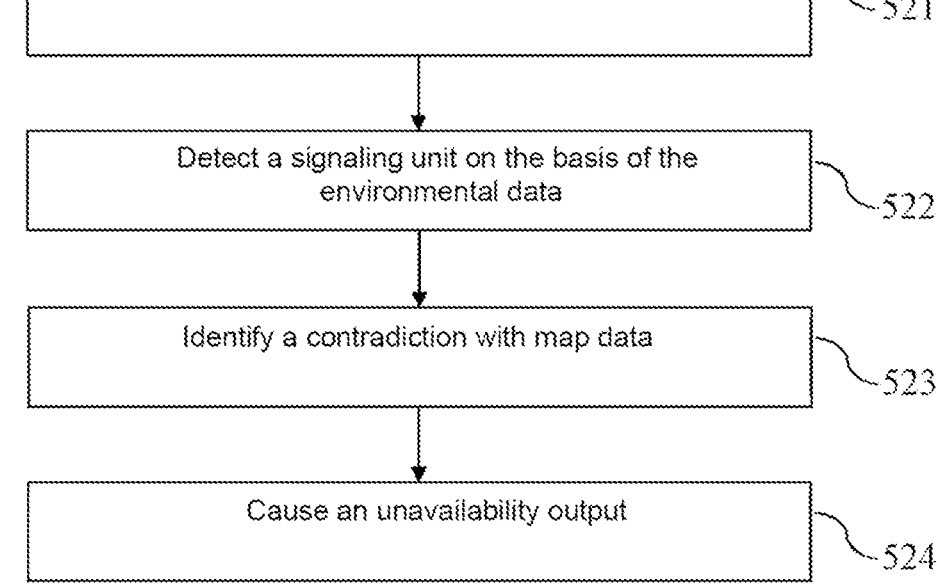

Determine environmental data — 521

Detect a signaling unit on the basis of the environmental data — 522

Identify a contradiction with map data — 523

Cause an unavailability output — 524

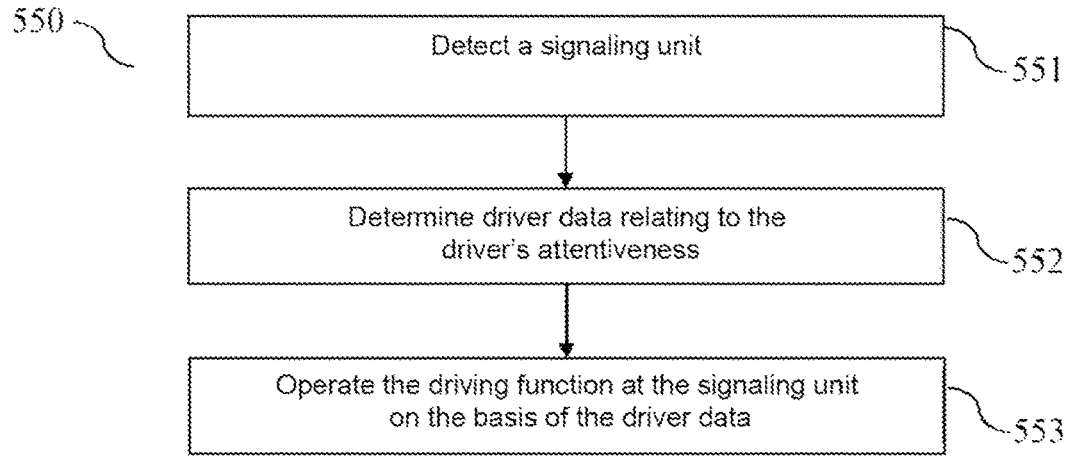

Detect a signaling unit — 551

Determine driver data relating to the driver's attentiveness — 552

Operate the driving function at the signaling unit on the basis of the driver data — 553

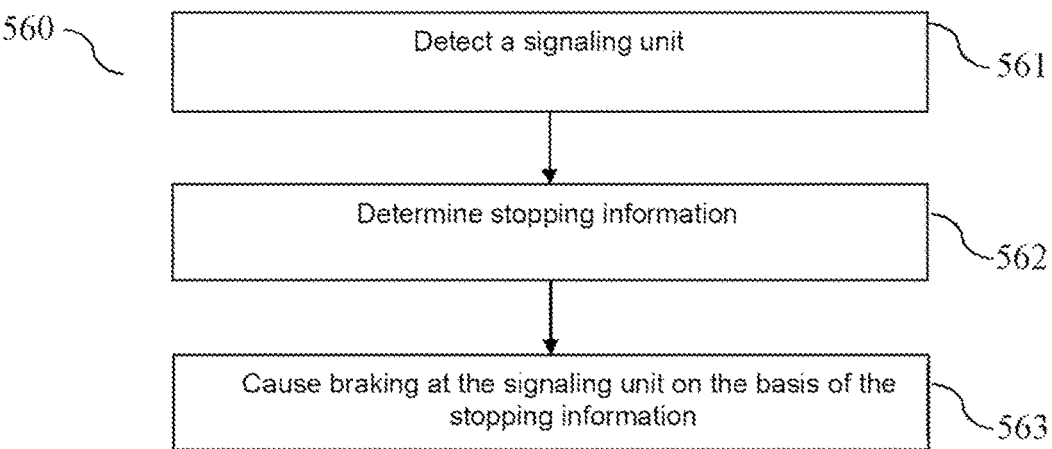

Detect a signaling unit — 561

Determine stopping information — 562

Cause braking at the signaling unit on the basis of the stopping information — 563

Determine that the vehicle is at a signaling unit — 571

Detect actuation of an operating element — 572

Cause an automated start-up process in response to the detected actuation of the operating element — 573

Fig. 5h

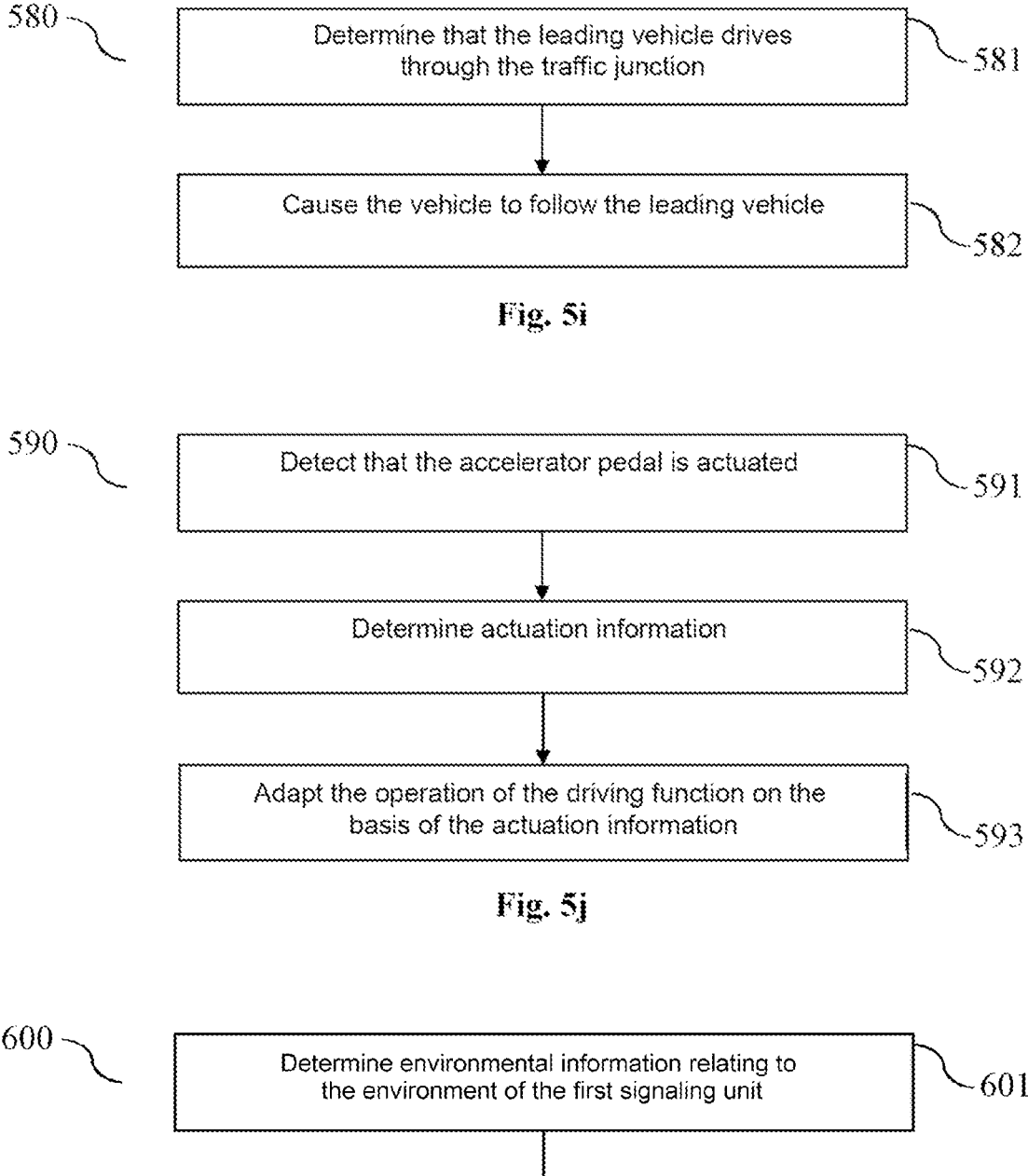

580 —

Determine that the leading vehicle drives through the traffic junction ⟶ 581

Cause the vehicle to follow the leading vehicle ⟶ 582

Detect that the accelerator pedal is actuated ⟶ 591

Determine actuation information ⟶ 592

Adapt the operation of the driving function on the basis of the actuation information ⟶ 593

Determine environmental information relating to the environment of the first signaling unit ⟶ 601

Operate the driving function at the first signaling unit on the basis of the environmental information ⟶ 602

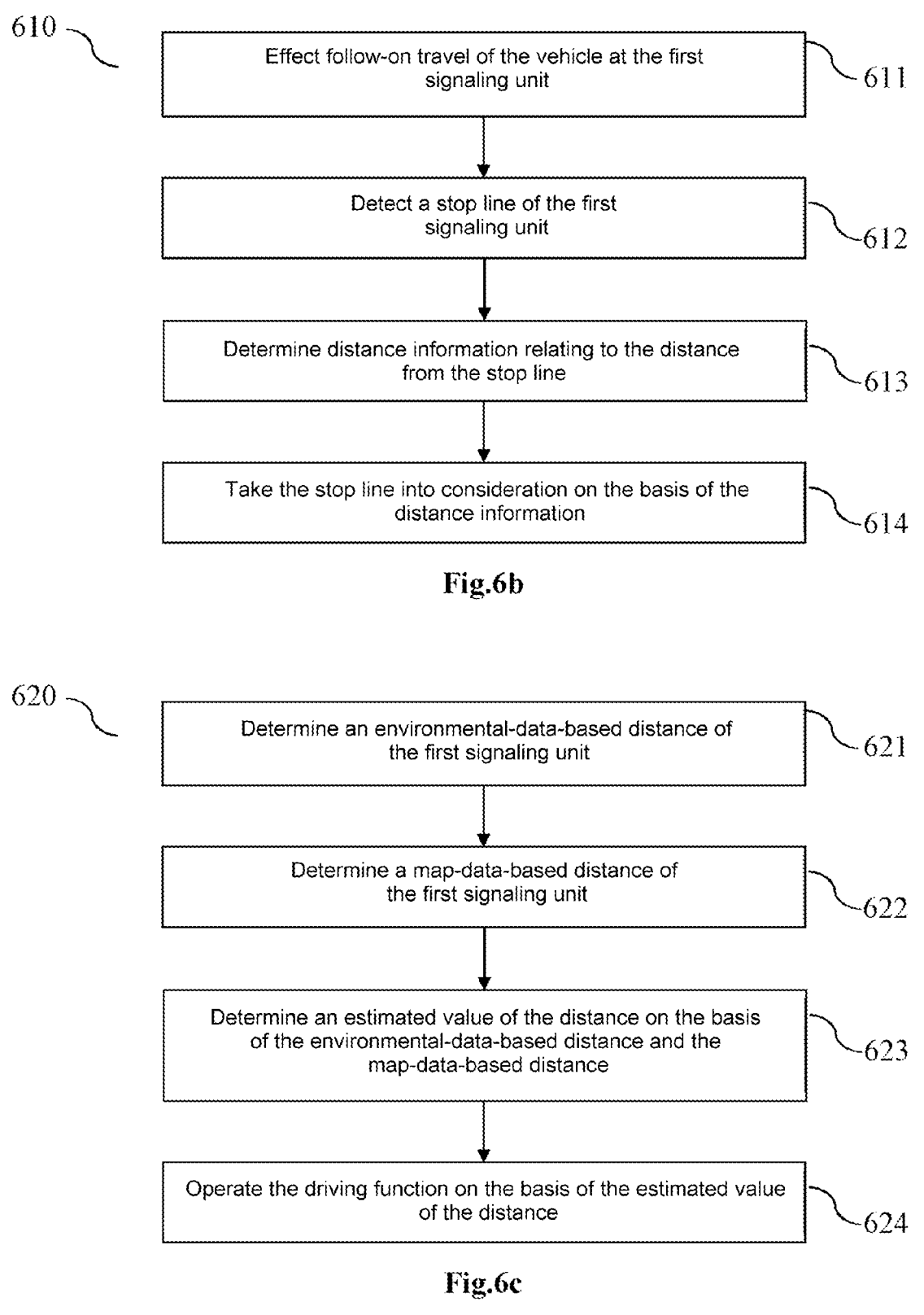

611 — Effect follow-on travel of the vehicle at the first signaling unit

612 — Detect a stop line of the first signaling unit

613 — Determine distance information relating to the distance from the stop line 614 — Take the stop line into consideration on the basis of the distance information

621 — Determine an environmental-data-based distance of the first signaling unit 622 — Determine a map-data-based distance of the first signaling unit 623 — Determine an estimated value of the distance on the basis of the environmental-data-based distance and the map-data-based distance 624 — Operate the driving function on the basis of the estimated value of the distance

Fig.6c

VEHICLE CONTROL SYSTEM AND METHOD FOR INCREASING THE ATTENTIVENESS OF A DRIVER WHEN OPERATING A DRIVING FUNCTION

BACKGROUND AND SUMMARY

The invention relates to a vehicle guidance system and to a corresponding method for operating a driving function, in particular a driver assistance function, of a vehicle in connection with a signaling unit.

A vehicle may have one or more driving functions which assist the driver of the vehicle with the guidance, in particular the longitudinal guidance, of the vehicle. An exemplary driving function for assisting with the longitudinal guidance of a vehicle is the Adaptive Cruise Control (ACC) function which can be used, for example on a highway or freeway, to longitudinally guide the vehicle at a defined set or target driving speed and/or at a defined target distance from a leading vehicle driving in front of the vehicle.

In urban areas, when driving on a street, a vehicle often encounters junctions between the street being used by the vehicle and one or more other traffic routes (for example another street, a pedestrian walkway, etc.). A light signal installation and/or a traffic sign (for instance a stop sign) may be arranged at a junction and is/are used to control the right of way at the junction. A light signal installation and/or a traffic sign for defining the right of way at, and/or the permission to enter or drive across, a junction is/are generally referred to as a signaling unit in this document.

The present document deals with the technical object of providing a driving function, in particular a driver assistance function, for the automated longitudinal guidance of a vehicle, which is configured to take signaling units into consideration in a reliable and robust manner, in particular in order to increase the availability and/or the safety and/or the comfort of the driving function.

The object is achieved by each individual independent claim. Advantageous embodiments are described, inter alia, in the dependent claims. It is pointed out that additional features of a patent claim dependent on an independent patent claim may form, without the features of the independent patent claim or only in combination with a subset of the features of the independent patent claim, a separate invention which is independent of the combination of all features of the independent patent claim and can be made into the subject matter of an independent claim, a divisional application or a subsequent application. This applies in the same manner to technical teachings which are described in the description and may form an invention that is independent of the features of the independent patent claims.

One aspect describes a vehicle guidance system for providing a driving function for the automated longitudinal guidance of a vehicle. The driving function may be designed, in particular, to longitudinally guide the vehicle in an automated manner at and/or in connection with a signaling unit. In this case, the driving function may be designed according to SAE level 2. In other words, the driving function may possibly provide automated driving and/or driver assistance (in relation to the longitudinal guidance) according to SAE level 2. The driving function may be restricted to the longitudinal guidance of the vehicle. The lateral guidance of the vehicle may be provided manually by the driver or by a further and/or separate driving function (for example by a lane-keeping assistant) during operation. The vehicle guidance system may be configured to longitudinally guide the vehicle in an automated manner according to a set or target speed and/or according to a target distance from a leading vehicle driving (directly) in front of the vehicle. For this purpose, the vehicle guidance system may provide a speed controller which sets, in particular controls, the actual driving speed of the vehicle according to the set or target speed. Alternatively or additionally, it is possible to provide a distance controller which sets, in particular controls, the actual distance of the vehicle from the leading vehicle according to the target distance. If there is no relevant leading vehicle or if the leading vehicle is driving faster than the set or target speed, the driving speed of the vehicle can be controlled. Alternatively or additionally, if the leading vehicle is driving more slowly than the set or target speed, the distance of the vehicle from the leading vehicle can be controlled. The vehicle guidance system may therefore be configured to provide an Adaptive Cruise Control (ACC) driver assistance function.

The vehicle and the vehicle guidance system may comprise a user interface for interacting with a user, in particular with the driver, of the vehicle. The user interface may comprise one or more operating elements which make it possible for the user to define the set or target speed and/or the target distance. Alternatively or additionally, the one or more operating elements may make it possible for the user to confirm a previously defined set and/or target speed and/or a previously designed target distance of the vehicle for the operation of the driving function. The one or more operating elements may be designed to be actuated using a hand and/or a finger of the driver. Alternatively or additionally, the one or more operating elements may be arranged on a steering means (in particular on a steering wheel or a steering handle) of the vehicle.

An exemplary operating element (in particular a plus/minus operating element) is a button and/or a rocker which can be used to increase or reduce the set and/or target speed or the target distance. A further exemplary operating element (in particular a set operating element) is a button which can be used to define a current driving speed of the vehicle as a set and/or target speed and can be used to define a current distance of the vehicle from the leading vehicle as a target distance. A further exemplary operating element (in particular a resume operating element) is a button which can be used to reconfirm or reactivate a set and/or target speed that has previously been set or a target distance which has previously been set.

The user interface may also comprise one or more output elements (for example a screen and/or a loudspeaker and/or a vibration element) which can be used to effect outputs to the user of the vehicle.

Furthermore, the vehicle guidance system may be configured to take into consideration one or more signaling units on the road (in particular street) and/or travel route used by the vehicle during the automated longitudinal guidance. A signaling unit may be provided for the purpose of defining the right of way at a junction (in particular an intersection) of the road network used by the vehicle. In this case, the definition of the right of way may be variable over time (like, for example, in the case of a light signal installation, for instance a traffic light system, having one or more different signal groups for one or more different directions of travel of the vehicle at the junction) or may be permanently specified (like, for example, in the case of a traffic sign, for instance a stop sign).

The vehicle guidance system may be configured to determine data relating to a signaling unit located ahead in the direction of travel of the vehicle. The data may comprise map data relating to signaling units in the road network used by the vehicle. The map data may each comprise one or more attributes for a signaling unit. The one or more attributes for a signaling unit may indicate or comprise:

a type of the signaling unit, in particular whether the signaling unit is a light signal installation or a traffic sign; and/or a number of different signal groups of the signaling unit for different directions of travel at the junction of the road network at which the signaling unit is arranged or with which the signaling unit is associated; and/or a position (for example the GPS coordinates) of the signaling unit and/or of the stop line of the signaling unit within the road network; and/or a relative distance of the stop line from the associated signaling unit.

The vehicle guidance system may be configured to determine the actual position (for example the current GPS coordinates) of the vehicle within the road network using a position sensor (for example a GPS receiver) of the vehicle. A (for example the next) signaling unit on the travel route of the vehicle can then be detected on the basis of the map data. One or more attributes relating to the detected signaling unit may also be determined.

Alternatively or additionally, the data relating to a signaling unit located ahead in the direction of travel of the vehicle may comprise environmental data relating to the signaling unit or may be determined on the basis of environmental data. The environmental data may be captured by one or more environmental sensors of the vehicle. Exemplary environmental sensors are a camera, a radar sensor, a lidar sensor, etc. The one or more environmental sensors may be configured to capture sensor data (that is to say environmental data) relating to the environment in front of the vehicle in the direction of travel.

The vehicle guidance system may be configured to detect, on the basis of the environmental data (in particular on the basis of the sensor data from a camera), that a signaling unit is arranged in front of the vehicle in the direction of travel. An image analysis algorithm, for example, can be used for this purpose. Furthermore, the vehicle guidance system may be configured to determine the type of the signaling unit (for example light signal installation or traffic sign) on the basis of the environmental data. The vehicle guidance system may also be configured to determine, on the basis of the environmental data, the (signaling) state of the signaling unit with respect to the permission to drive cross the junction associated with the signaling unit. In particular, the colors (green, amber or red) of the one or more signal groups of a light signal installation can be determined.

The vehicle guidance system may be configured to take a detected signaling unit into consideration during the automated longitudinal guidance of the vehicle. In particular, the vehicle guidance system may be configured to determine whether or not the vehicle must stop at the signaling unit, in particular at the stop line of the signaling unit, on the basis of the data relating to the detected signaling unit, in particular on the basis of the color of a light signal from or of a signal group of the signaling unit that is indicated by the data. For example, it is possible to identify that the vehicle must stop since the signal group relevant to the vehicle is read. Alternatively, it is possible to identify that the vehicle need not stop since the signal group relative to the vehicle is green. In a further example, it is possible to identify that the vehicle must stop since the signaling unit is a stop sign.

The vehicle guidance system may also be configured to cause the vehicle to be stopped in an automated manner at the detected signaling unit if it is determined that the vehicle must stop at the signaling unit. An automated deceleration process (to a standstill) can be effected for this purpose. In this case, the vehicle can be guided in an automated manner up to or in front of the stop line of the signaling unit. During the automated deceleration process, the vehicle guidance system can control one or more wheel brakes (for example one or more friction brakes or one or more regenerative brakes) in an automated manner in order to brake the vehicle (to a standstill). In this case, the temporal profile of the effected deceleration may depend on the available braking distance to the detected signaling unit.

Alternatively or additionally, the vehicle guidance system may be configured to cause the vehicle to be longitudinally guided in an automated manner past the detected signaling unit, in particular across the stop line of the signaling unit, if it is determined that the vehicle need not stop at the signaling unit. In this case, the speed and/or distance control according to the set or target speed and/or according to the target distance from the leading vehicle can be continued.

The vehicle guidance system may therefore be configured to provide an ACC driving function, taking signaling units into consideration. In this document, the driving function is also referred to as an Urban Cruise Control (UCC) driving function.

As already explained further above, the vehicle guidance system may be configured to longitudinally guide the vehicle within the scope of the driving function in an automated manner on the basis of a target speed and/or on the basis of a target distance from a leading vehicle driving in front of the vehicle. The vehicle guidance system may also be configured, if a (possibly detected) signaling unit is not taken into consideration in the driving function, to longitudinally guide the vehicle in an automated manner past the signaling unit, in particular beyond the stop line of the signaling unit, on the basis of the target speed and/or on the basis of the target distance, in particular irrespective of the color of a light signal from the signaling unit. The driving function may therefore possibly be operated (if a signaling unit is not taken into consideration) as if the signaling unit (and the associated junction) did not exist.

The vehicle guidance system may possibly make it possible for the user of the vehicle to configure the driving function via the user interface (for example in a configuration menu). In this case, it is possible to set, if appropriate, whether the driving function is intended to be operated in an automatic mode or is intended to be operated in a manual mode.

In the automatic mode, the driving function can be operated in such a manner that a signaling unit that is detected by the vehicle guidance system and is located ahead in the direction of travel is automatically taken into consideration during operation of the driving function (and possibly results in automated deceleration of the vehicle). In particular, the vehicle guidance system in the automated mode may be configured to take into consideration a signaling unit, which is detected on the basis of map data and/or environmental data, automatically, in particular without confirmation by the user of the vehicle, during the automated longitudinal guidance of the vehicle (for example in order to cause automated deceleration of the vehicle at the detected signaling unit if necessary).

On the other hand, the driving function can be operated in the manual mode in such a manner that the detected signaling unit is taken into consideration during the automated longitudinal guidance of the vehicle only after confirmation by the user of the vehicle (and possibly results in automated deceleration of the vehicle). In particular, the vehicle guidance system in the manual mode may be configured to output an offer relating to the consideration of the detected signaling unit to the user of the vehicle (via the user interface of the vehicle). For example, it can be displayed on the screen that a signaling unit has been detected and feedback from the user is required (in order to cause the signaling unit to be taken into consideration during the automated longitudinal guidance of the vehicle). The detected signaling unit (in particular the signaling state of the signaling unit) can then (in particular only then) be taken into consideration during the automated longitudinal guidance of the vehicle at the signaling unit when the offer is accepted by the user (for example by actuating an operating element, in particular the set operating element). Automated deceleration of the vehicle at the detected signaling unit is then carried out, if necessary. On the other hand, the vehicle guidance system may be configured to not take the detected signaling unit (in particular the signaling state of the signaling unit) into consideration and/or to ignore it during the automated longitudinal guidance of the vehicle at the signaling unit if the offer is not accepted by the user. In this case, the speed and/or distance control can be continued (without taking the signaling unit into consideration, in particular as if the signaling unit were not present).

The comfort of the driving function can be increased further by providing different (settable) modes for operating the driving function (in particular the UCC driving function).

The vehicle guidance system may be designed to inform the user of the driving function about the status of the driving function using the user interface. In particular, the user of the driving function can be informed about whether or not a signaling unit, which is detected by the vehicle guidance system and is located ahead in the direction of travel, is taken into consideration during operation of the driving function, in particular during the automated longitudinal guidance of the vehicle.

In particular, the vehicle guidance system may be configured to determine (for example on the basis of the map data and/or the environmental data), whether or not a signaling unit that is located ahead in the direction of travel is or can be taken into consideration during operation of the driving function. If the signaling unit is or can be taken into consideration, an availability output, in particular an availability display, can possibly be output in order to inform the user that the signaling unit located ahead is taken into consideration during the automated longitudinal guidance of the vehicle (and therefore there is automated deceleration of the vehicle at the signaling unit if necessary).

Alternatively or additionally, the vehicle guidance system may be configured (if it is determined that the signaling unit located ahead is not or cannot be taken into consideration in the driving function) to effect an unavailability output, in particular an unavailability display, (via the user interface) in order to inform the user of the vehicle that the signaling unit located ahead is not taken into consideration during the automated longitudinal guidance of the vehicle (and therefore there is also no automated deceleration of the vehicle on the basis of the signaling state of the signaling unit).

The comfort and the safety of the driving function can be increased further by outputting an availability and/or unavailability output. The availability and/or unavailability outputs may each comprise an optical, acoustic and/or haptic output.

The vehicle guidance system may be configured to determine that the signaling state of that signal group of the signaling unit which is relevant to the direction of travel of the vehicle changes (for example while the vehicle is moving toward the signal group or while the vehicle is at the signal group). For example, it is possible to detect that a phase changes from red to green.

The vehicle guidance system may also be configured (in response to the detected phase change) to cause information relating to the changed signaling state of the signal group of the signaling unit to be communicated to the driver of the vehicle. For example, it is possible to cause a symbol of the signaling unit that is detected (and is possibly taken into consideration during the automated longitudinal guidance) to be displayed via an output element (in particular on a screen) of the user interface as long as the signal group has the color red. After a detected phase change to green, the displayed symbol can then be withdrawn if appropriate and the output can be ended. It is therefore possible to reliably communicate to the driver of the vehicle that a (possibly automated) start-up process can be effected (for example by actuating an operating element of the user interface), for example after the vehicle has been at a standstill at the signaling unit. In this case, the display can be consistently withdrawn in the automatic mode and/or in the manual mode of the driving function.

The vehicle guidance system may be configured to output a takeover request to the driver of the vehicle if the driving function is aborted. For example, it is possible to identify that the automated longitudinal guidance (on the basis of the set and/or target speed and/or on the basis of the target distance) cannot be continued or is not continued. The driving function can be aborted, for example, if the driver of the vehicle (substantially) intervenes in the longitudinal guidance of the vehicle (for example by virtue of the driver of the vehicle actuating the brake pedal or the accelerator pedal). A takeover request (TOR) can then be output to the driver of the vehicle. The longitudinal guidance must then be effected by the driver again. The safety of the operation of the vehicle can be increased by outputting a takeover request.

Alternatively or additionally, a takeover request can be output if manual intervention by the driver in the longitudinal guidance of the vehicle is expected. For example, it is possible to identify that the vehicle guidance system can no longer automatically carry out the longitudinal guidance (for example in order to reach a particular destination, for instance at a signaling unit). A takeover request can then be output to the driver of the vehicle in response to this.

This document repeatedly mentions a "first" signaling unit in order to identify a particular signaling unit. The "first" signaling unit is not (necessarily) a signaling unit which is arranged first in a list of signaling units.

As already explained above, the driving function can be operated in an automatic mode or alternatively in a manual mode at a detected signaling unit. In this case, the signaling unit can be taken into consideration automatically in the automatic mode during the automated longitudinal guidance of the vehicle at the signaling unit (for example in order to effect automated deceleration of the vehicle at the signaling unit). On the other hand, the signaling unit can be taken into consideration in the manual mode possibly only after confirmation by a user, in particular by the driver, of the vehicle during the automated longitudinal guidance (in particular during automated deceleration) of the vehicle at the signaling unit.

The decision regarding whether the driving function is operated in the automatic mode or in the manual mode at a signaling unit may depend on a standard behavior of the driving function. In this case, one or more rules that are used as standard may be used to individually decide, for each individual signaling unit, whether the driving function can be operated in the automatic mode or only in the manual mode. The vehicle guidance system may also be configured to operate the driving function in the automatic mode as standard if it has been determined (on the basis of the one or more rules) that the automatic mode is possible, and to operate the driving function in the manual mode if it has been determined (on the basis of the one or more rules) that only the manual mode is possible.

The vehicle guidance system may be configured to sequentially detect a multiplicity of signaling units during a journey of the vehicle. In other words, signaling units at junctions, across which the vehicle drives during a journey, can be gradually detected on the journey of the vehicle. The individual signaling units may be detected on the basis of the environmental data and/or on the basis of the map data.

The vehicle guidance system is also configured to determine, for each of the multiplicity of signaling units, on the basis of data (in particular on the basis of the environmental data and/or the map data) relating to the respective signaling unit, whether the driving function can be operated in the automatic mode or only in the manual mode at the respective signaling unit. This may take place on the basis of the one or more standard rules.

The vehicle guidance system may be configured, in particular, to determine the number of different signal groups of the signaling unit on the basis of the data (in particular on the basis of the map data and/or the environmental data) relating to one signaling unit from the multiplicity of signaling units. It can then be determined, on the basis of the number of different signal groups, whether the driving function can be operated in the automatic mode or only in the manual mode at the signaling unit. For example, it is possible to decide that the driving function can be operated in the automatic mode if the signaling unit has only a single signal group. On the other hand, it is possible to decide that the driving function can be operated only in the manual mode if the signaling unit has a plurality of different signal groups.

The vehicle guidance system may be configured to operate the driving function in the manual mode at at least a first signaling unit from the multiplicity of signaling units even though it was determined, on the basis of the data relating to the first signaling unit, that the first signaling unit can be operated in the automatic mode. In particular, the vehicle guidance system may be configured to operate the driving function (infrequently and/or occasionally) in the manual mode at a signaling unit in a manner differing from the standard behavior even though the driving function should be operated in the automatic mode at the signaling unit according to standard behavior.

It is therefore possible to occasionally (for example between 2 and 10% of the cases) cause the driving function to behave differently from the standard behavior. A familiarization effect of the driver of the vehicle with respect to the automation of the vehicle can therefore be avoided and the attentiveness of the driver when monitoring the driving function can be increased.

The vehicle guidance system may be configured to select the first signaling unit (pseudo-) randomly and/or using a random number generator. In this case, it is possible to cause the driving function to nevertheless be operated in the manual mode on average at a particular fraction of the signaling units at which the driving function is operated in the automatic mode according to standard behavior. In this case, the individual signaling units may be selected (pseudo-) randomly. The familiarization effect of the driver of the vehicle when using the driving function can therefore be avoided in a particularly reliable manner.

The vehicle guidance system may be configured to change, in particular increment, a counter at each signaling unit from the multiplicity of signaling units at which the driving function is operated in the automatic mode. In this case, the counter may be incremented (starting from 0 or 1) to a period value and can then possibly be reset.

The first signaling unit (for which the manual mode is used in a manner differing from the standard behavior of the driving function) can then be robustly and efficiently selected on the basis of the value of the counter, in particular in such a manner that that signaling unit for which the counter corresponds to the period value or a multiple of the period value is selected.

The vehicle guidance system may be configured to determine the starting value of the counter at the beginning of the journey (in particular at the beginning of each journey) of the vehicle using a random number generator. In this case, a (pseudo-random) starting value of between 0 or 1 and the period value may be determined. A uniformly distributed, random selection of signaling units at which the driving function differs from the standard behavior can therefore be determined in a particularly reliable and robust manner.

The vehicle guidance system may be configured to select the at least one first signaling unit (at which the driving function differs from the standard behavior) from the multiplicity of signaling units in such a manner that on average, in particular on average during the journey of the vehicle, the driving function is nevertheless operated in the manual mode at X % of the signaling units, for which it is determined, on the basis of the data, that the driving function can be operated in the automatic mode. In this case, X may be, for example, 4 or more, for instance between 4 and 10. A familiarization effect of the driver of the vehicle can therefore be avoided in a particularly reliable manner.

A further aspect describes a method for providing a driving function for the automated longitudinal guidance of a vehicle at a signaling unit, wherein the driving function has an automatic mode and a manual mode.

The method comprises sequentially detecting a multiplicity of signaling units during a journey of the vehicle. The method also comprises determining, for each of the multiplicity of signaling units, on the basis of data relating to the respective signaling unit, whether the driving function can be operated in the automatic mode or only in the manual mode at the respective signaling unit. The method also comprises operating the driving function in the manual mode at at least a first signaling unit from the multiplicity of signaling units, even though it was determined, on the basis of the data relating to the first signaling unit, that the first signaling unit can be operated in the automatic mode.

In this case, the first signaling unit may be selected from the multiplicity of signaling units in a temporally (pseudo-) random manner or by means of a temporal random number generator. In other words, during the journey of the vehicle, at least one signaling unit can be selected in a (temporally) random manner from the multiplicity of signaling units at which the driving function is operated in the manual mode (even though the driving function could be operated in the automatic mode).

A further aspect describes a (road) motor vehicle (in particular an automobile or a truck or a bus or a motorcycle) which comprises at least one of the vehicle guidance systems described in this document.

A further aspect describes a software (SW) program. The SW program may be configured to be executed on a processor (for example on a control device of a vehicle) and to thereby carry out at least one of the methods described in this document.

A further aspect describes a storage medium. The storage medium may comprise a SW program which is configured to be executed on a processor and to thereby carry out at least one of the methods described in this document.

Within the context of the document, the term "automated driving" can be understood as meaning driving with automated longitudinal or lateral guidance or autonomous driving with automated longitudinal and lateral guidance. Automated driving can involve for example driving for a relatively long time on the freeway or driving for a limited time in the context of parking or maneuvering. The term "automated driving" encompasses automated driving with an arbitrary degree of automation. Exemplary degrees of automation are assisted, partly automated, highly automated or fully automated driving. These degrees of automation were defined by the German Federal Highway Research Institute (BASt) (see BASt publication "Forschung kompakt", issue 11/2012). In the case of assisted driving, the driver permanently carries out the longitudinal or lateral guidance, while the system performs the respective other function within certain limits. In the case of partly automated driving, the system performs the longitudinal and lateral guidance for a certain period of time and/or in specific situations, wherein the driver must permanently monitor the system as in the case of assisted driving. In the case of highly automated driving, the system performs the longitudinal and lateral guidance for a certain period of time, without the driver having to permanently monitor the system; however, the driver must be able to take over guidance of the vehicle within a certain time. In the case of fully automated driving, the system can automatically manage driving in all situations for a specific application; a driver is no longer required for this application. The four degrees of automation mentioned above correspond to SAE levels 1 to 4 of the SAE J3016 standard (SAE—Society of Automotive Engineering). For example, highly automated driving corresponds to level 3 of the SAE J3016 standard. Furthermore, SAE J3016 also provides SAE level 5 as the highest degree of automation, which is not contained in the definition by the BASt. SAE level 5 corresponds to driverless driving, during which the system can automatically manage all situations like a human driver during the entire journey; a driver is generally no longer required. The aspects described in this document relate, in particular, to a driving function and a driver assistance function which are designed according to SAE level 2.

It should be noted that the methods, apparatuses and systems described in this document can be used both alone and in combination with other methods, apparatuses and systems described in this document. Furthermore, any aspects of the methods, apparatuses and systems described in this document can be combined with one another in various ways. In particular, the features of the claims can be combined with one another in various ways.

The invention is described in more detail below on the basis of exemplary embodiments.

BRIEF DESCRIPTION OF THE DRAWINGS

FIG. 1 shows exemplary components of a vehicle;
FIG. 2a shows an exemplary light signal installation;
FIG. 2b shows an exemplary traffic sign;
FIG. 3 shows an exemplary traffic situation;
FIG. 4 shows an exemplary user interface; and FIGS. 5a to 5j and FIGS. 6a to 6e show flowcharts of exemplary methods for providing a driving function for the automated longitudinal guidance of a vehicle at a signaling unit.

DETAILED DESCRIPTION OF THE DRAWINGS

Figure 5D:
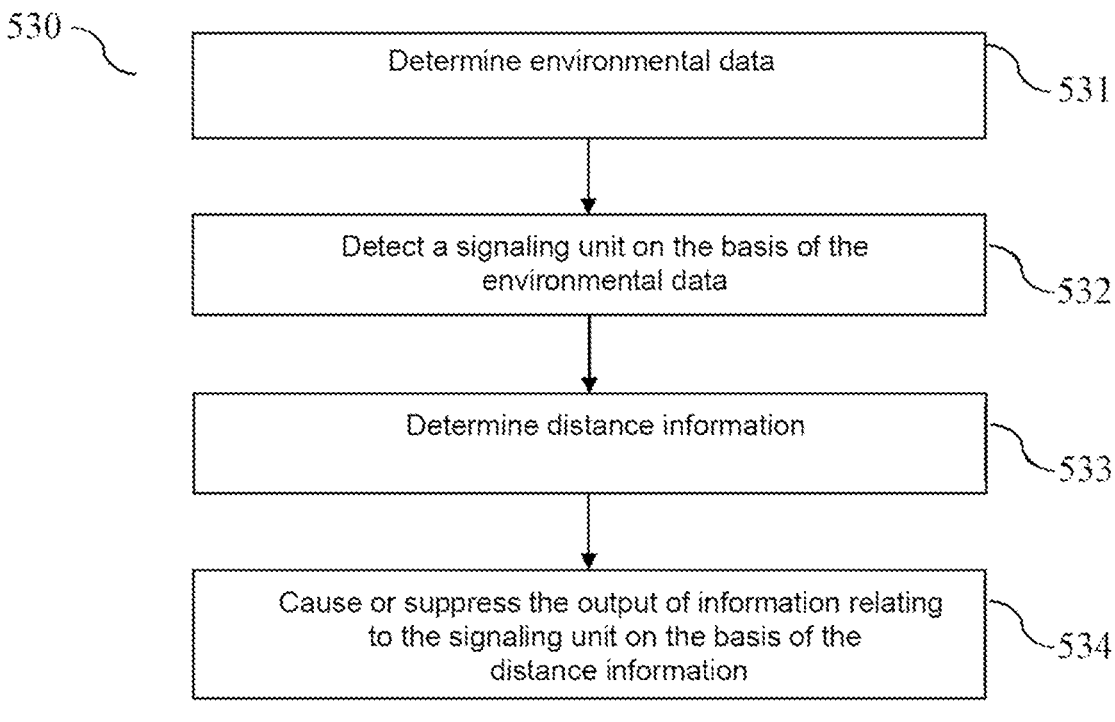

As explained at the outset, the present document deals with increasing the reliability, the availability and the comfort of a driving function, in particular a driver assistance system, of a vehicle in connection with a signaling unit at a junction between the road or street used by the vehicle and another traffic route.

FIG. 1 shows exemplary components of a vehicle 100. The vehicle 100 comprises one or more environmental sensors 103 (for example one or more imaging cameras, one or more radar sensors, one or more lidar sensors, one or more ultrasonic sensors, etc.) which are configured to capture environmental data relating to an environment of the vehicle 100 (in particular relating to the environment in front of the vehicle 100 in the direction of travel). The vehicle 100 also comprises one or more actuators 102 which are configured to act on the longitudinal and/or lateral guidance of the vehicle 100. Exemplary actuators 102 are: a brake system, a drive motor, a steering system, etc.

The control unit 101 may be configured to provide a driving function, in particular a driver assistance function, on the basis of the sensor data from the one or more environmental sensors 103 (that is to say on the basis of the environmental data). For example, an obstacle on the driving trajectory of the vehicle 100 may be detected on the basis of the sensor data. The control unit 101 can then control one or more actuators 102 (for example the brake system) to decelerate the vehicle 100 in an automated manner and to thereby prevent a collision between the vehicle 100 and the obstacle.

Within the scope of the automated longitudinal guidance of a vehicle 100 in particular, in addition to a leading vehicle, one or more signaling units (for example a light signal installation and/or a traffic sign) on the road or street used by the vehicle 100 may be taken into consideration. In this case, the status of a light signal installation or traffic light system may be taken into consideration, in particular, with the result that the vehicle 100 causes deceleration to the stop line of the traffic light in an automated manner at a red traffic light relevant to the vehicle's own (planned) direction of travel and/or accelerates (possibly again) in the case of a green traffic light.

Light signal installations may be designed in a very heterogeneous manner in different countries and may also be of varying complexity with regard to the direction of travel/light signal assignment. Different directions of travel may therefore be controlled in a bundled manner by means of a first group of signals or by means of one signal group and another direction may be controlled by means of another signal group. The repeating signals from a signal group may also be geographically located at different points of an intersection. It may therefore be difficult for a control unit 101 (also referred to as a vehicle guidance system in this document) to identify, on the basis of the sensor data, which one or more signals from a light signal installation at an intersection are relevant to the planned direction of travel of the vehicle 100 and which are not (in particular if the vehicle 100 is still relatively far away from the light signal installation).

FIG. 2a shows an exemplary light signal installation 200. The light signal installation 200 illustrated in FIG. 2a has four different signal generators 201 which are arranged at different positions at an entrance to an intersection. The left-hand signal generator 201 has an arrow 202 to the left and therefore indicates that this signal generator 201 applies to traffic turning left. The two middle signal generators 201 have an upward arrow 202 (or no arrow 202) and therefore indicate that these two signal generators 201 apply to driving straight ahead. The individual light signals from these two signal generators 201 form signal groups. Furthermore, the right-hand signal generator 201 has an arrow 202 to the right and therefore indicates that this signal generator 201 applies to traffic turning right.

The light signal installation 200 illustrated in FIG. 2*a* is only one example of many different possible configurations of a light signal installation 200. A light signal installation 200 may have a relatively large number of different forms of features. Exemplary features are the number of signal generators 201 and/or signal groups;

the positions of the one or more signal generators 201; and/or the assignment of a signal generator 201 to a possible direction of travel across an intersection.

FIG. 2*b* shows an exemplary stop sign as a traffic sign 210 which controls the right of way at a traffic junction, in particular at an intersection. The control unit 101 of the vehicle 100 may be configured to detect a traffic sign 210 relevant to the right of way of the vehicle 100 on the street or road used by the vehicle 100 on the basis of the sensor data from the one or more environmental sensors 103 (that is to say on the basis of the environmental data) and/or on the basis of digital map information (that is to say map data).

FIG. 3 shows, by way of example, a vehicle 100 which is moving toward a signaling unit 200, 210 (in particular a light signal installation 200 and/or a traffic sign 210) on a road. The one or more environmental sensors 103 of the vehicle 100 may be configured to capture sensor data (in particular image data) relating to the signaling unit 200, 210. The sensor data can then be analyzed (for example by means of an image analysis algorithm) in order to determine forms of one or more features of the signaling unit 200, 210. In particular, it is possible to determine, on the basis of the sensor data, whether the signaling unit 200, 210 is a light signal installation 200 or a traffic sign 210. It is also possible to determine which signal generator 201 of the light signal installation 200 is relevant to the (planned) direction of travel of the vehicle 100. Furthermore, the (signaling) state of the relevant signal generator 201 (for example the color, for instance red, amber or green) can be determined.

The quality and/or the reliability with which the form of a feature of a signaling unit 200, 210 can be determined on the basis of the environmental data is/are typically dependent on the distance 311 of the vehicle 100 from the signaling unit 200, 210. Furthermore, current weather conditions typically also have a significant influence on the quality and/or the reliability of the determined form of a feature. In addition, the quality and/or reliability may be different for different features.

The vehicle 100 may have a storage unit 104 which stores digital map information (that is to say map data) relating to the street network used by the vehicle 100. The map data may indicate, as attributes, forms of one or more features of one or more signaling units 200, 210 in the road network. In particular, the map data may indicate, for a light signal installation 200, the assignment of the one or more signal generators 201 or signal groups 201 to different possible directions of travel. In other words, the map data may indicate which signal generator or which signal group 201 is responsible for enabling which direction of travel. The map data may possibly be received at the vehicle 100 by means of a communication unit 105 of the vehicle 100 via a wireless communication connection (for example a WLAN or LTE communication connection).

The control unit 101 of the vehicle 100 may be configured to determine (for example on the basis of the current position of the vehicle 100 and on the basis of a planned travel route and/or on the basis of the environmental data from the one or more environmental sensors 103) that the vehicle 100 is heading for a signaling unit 200, 210 that is located ahead. Furthermore, the control unit 101 may determine the forms of one or more features of the signaling unit 200, 210 located ahead on the basis of the (stored and/or received) map data. In particular, it is possible to determine, on the basis of the map data, which signal generator or which signal group 201 of a light signal installation 200 is assigned to the current or planned direction of travel of the vehicle 100. In addition, the current status of the assigned signal generator or of the assigned signal group 201 can be determined on the basis of the environmental data. An automated driving function (for example automated longitudinal guidance of the vehicle 100) may then be performed in a reliable and comfortable manner on the basis thereof. In particular, the forms of the one or more relevant features of a signaling unit 200 may already be determined in the case of a relatively great distance 311 of the vehicle 100 from the signaling unit 200 by taking the map data into consideration, thus making it possible to increase the reliability, the availability and the comfort of an automated driving function.

A vehicle 100 may be configured to use information relating to a signaling unit 200, 210, which is being or has been passed by the vehicle 100, to create and/or supplement the map data. The map data may be created and/or supplemented locally by the vehicle 100 and/or centrally by a central unit 300 (for example by a backend server) (see FIG. 3). In the immediate vicinity of a signaling unit 200, 210, the one or more environmental sensors 103 of a vehicle 100 can typically capture environmental data which precisely indicate the form of one or more features of the signaling unit 200, 210. In particular, in the immediate vicinity, the assignment between signal generators or signal groups 201 and possible directions of travel may be determined in a precise and reliable manner on the basis of the captured environmental data.

The vehicle 100 may be configured to transmit the determined information (for example the environmental data and/or the determined forms of the one or more features) to the central unit 300 via a wireless communication connection 301 (in conjunction with an identifier for the respective signaling unit 200, 210, for instance in conjunction with the position of the signaling unit 200, 210). The central unit 300 can then create and/or update, on the basis of the information provided by a multiplicity of vehicles 100, map data respectively indicating, as attributes, the forms of one or more features for a multiplicity of different signaling units 200, 210. The map data may then be made available to the individual vehicles 100 in order to (as explained above) assist with the operation of an automated driving function.

The vehicle 100 typically comprises a user interface 107 having one or more operating elements and/or one or more output elements. FIG. 4 shows an exemplary user interface 107 having a display unit 400, in particular a screen, for outputting optical information. A suggestion for the automatic guidance of the vehicle 100 at a signaling unit 200, 210 located ahead may be output on the display unit 400, for example using a display element 401. Alternatively or additionally, it may be possible to possibly provide a display element 402 which is used to display the status of the driving function (for example active or inactive).

Alternatively or additionally, the user interface 107 may comprise, as an output element, at least one loudspeaker 420 which can be used to output an acoustic output (for example a warning tone) to the driver of the vehicle 100.

Furthermore, the user interface 107 may comprise one or more operating elements 411, 412, 413 which make it possible for the driver of the vehicle 100 to activate and/or parameterize the driving function. An exemplary operating element is a rocker 411 which makes it possible for the driver to define, in particular increase or reduce, a set speed (that is to say a target driving speed) for the vehicle 100. A further exemplary operating element is a set operating element 412 which makes it possible for the driver to define the current driving speed as a set speed and/or to accept a suggestion for the automatic guidance of the vehicle 100 at a signaling unit 200, 210 located ahead. Furthermore, the user interface 107 may comprise a resume operating element 413 which makes it possible for the driver, for example, to reactivate the driving function with a previously defined set speed.

The control unit 101 of the vehicle 100 may be designed to provide automated longitudinal guidance of the vehicle 100 in urban areas. This driving function can be referred to, for example, as an Urban Cruise Control (UCC) driving function. In this case, the driving function may be provided in an automatic mode (aUCC) and/or in a manual mode (mUCC). In this case, it may be possible for the driver to define, via the user interface 107, whether the driving function is intended to be operated in the automatic mode or in the manual mode.

The control unit 101 of the vehicle 100 may be configured to detect a signaling unit 200, 210 located ahead on the travel route of the vehicle 100 on the basis of the environmental data from the one or more environmental sensors 103 and/or on the basis of the map data (in conjunction with the position data from the position sensor 106 of the vehicle 100). In the manual mode of the UCC driving function, a suggestion or a request relating to whether or not the signaling unit 200, 210 is intended to be taken into consideration during the automated longitudinal guidance of the vehicle 100 can then be output via the user interface 107. The driver of the vehicle 100 can then accept or reject or ignore the suggestion, for example by actuating the set operating element 412. On the other hand, in the automatic mode of the UCC driving function, the detected signaling unit 200, 210 may possibly be taken into consideration automatically (that is to say without the required feedback from the driver) during the automated longitudinal guidance of the vehicle 100.

If the detected signaling unit 200, 210 is taken into consideration during the automated longitudinal guidance of the vehicle 100, automatic deceleration can be effected (depending on the type and/or (signaling) state of the signaling unit 200, 210) in order to change the vehicle 100 to a standstill in an automated manner (for example in the case of a red traffic light or a stop sign). Furthermore, the vehicle 100 may be automatically started up (for example after the (signaling) state of the signaling unit 200, 210 changes, for instance after a change to green). The vehicle 100 can then be accelerated in an automated manner to the set speed again (taking into consideration a defined minimum or target distance to a leading vehicle).

The UCC driving function can therefore make it possible for the driver of a vehicle 100 to also use the ACC driving function on a street with one or more signaling units 200, 210 (without having to deactivate and reactivate the ACC function in each case at the individual signaling units 200, 210).

The control unit 101 may be configured to determine whether or not a signaling unit 200, 210 located ahead can be taken into consideration during the automated longitudinal guidance on the basis of the environmental data and/or on the basis of the map data. If it is determined that the signaling unit 200, 210 located ahead cannot be taken into consideration during the automated longitudinal guidance, it is possible to effect an output (for example an optical output via a display unit 400, 402) to the driver of the vehicle 100 in order to inform the driver of the vehicle 100 that the signaling unit 200, 210 located ahead cannot be taken into consideration during the automated longitudinal guidance. This display may be referred to as an "unavailability display". The task of the driver of the vehicle 100 is then to decelerate the vehicle 100 if necessary before the signaling unit 200, 210 (for example because the traffic light changes to red or because the signaling unit 200, 210 is a stop sign).

Furthermore, the control unit 101 may be configured to identify, during operation of the UCC driving function, that the vehicle 100 cannot be longitudinally guided (any longer) in an automated manner (for example because the driver has manually intervened in the longitudinal guidance of the vehicle 100). In this case, a takeover request (TOR) can be output to the driver of the vehicle 100 in order to prompt the driver to manually take over the longitudinal guidance of the vehicle 100.

The vehicle 100 may comprise one or more driver sensors 108 which are configured to capture sensor data relating to the driver of the vehicle 100 (these sensor data are also referred to as driver data in this document). An exemplary driver sensor 108 is a camera aimed at the driver's position in the vehicle 100. The control unit 101 may be configured to determine, on the basis of the driver data, whether or not the driver has sufficiently high attentiveness with respect to the driving task or with respect to the monitoring of the driving function. Alternatively or additionally, the degree of attentiveness of the driver with respect to the driving task or with respect to the monitoring of the driving function can be determined. Furthermore, the control unit 101 may be configured to operate the driving function, in particular the UCC driving function, on the basis of the determined degree of attentiveness of the driver. The comfort and the safety of the driving function can therefore be increased further.

As already explained above, the control unit 101 may be configured to identify or detect a signaling unit 200, 210 located ahead on the basis of map data (in conjunction with position data relating to the current position of the vehicle 100). Furthermore, the control unit 101 may be configured to identify or detect the signaling unit 200, 210 located ahead on the basis of environmental data from one or more environmental sensors 103 (in particular from a camera) of the vehicle 100. The automated (UCC) driving function can be operated at the detected signaling unit 200, 210 on the basis of whether the signaling unit 200, 210 has been detected on the basis of the map data and/or on the basis of the environmental data;

the detection time at or from which the signaling unit 200, 210 was detected on the basis of the map data and/or on the basis of the environmental data; and/or the configuration time at which a configuration change of the UCC function (for example between the automatic mode and the manual mode) was made relative to the detection time of the signaling unit 200, 210.

In particular, the control unit 101 may be configured to inform the driver about the unavailability of the automated assistance with the longitudinal guidance at the detected signaling unit 200, 210 (for example by means of an optical, haptic and/or acoustic output via the user interface 107) if the signaling unit 200, 210 was detected only on the basis of the environmental data, but not on the basis of the map data.

The control unit 101 may therefore be configured to offer and/or provide automated assistance with the longitudinal guidance at the detected signaling unit 200, 210 possibly only when the signaling unit 200, 210 is detected not only on the basis of environmental data but also on the basis of map data. If the automated assistance with the longitudinal guidance cannot be provided at the detected signaling unit 200, 210, the driver can be informed about the unavailability of the automated assistance via the user interface 107 (by means of an unavailability output). Safe operation of the UCC driving function can therefore be enabled. In particular, it is therefore possible to reliably avoid the stop line of a detected signaling unit 200, 210 being driven across in an impermissible manner because the driver incorrectly assumes that he is being assisted with the longitudinal guidance at the detected signaling unit 200, 210.

In the case of a signaling unit 200, in particular in the case of a light signal installation 200, having a plurality of signal groups 201, it is often not possible to reliably identify which traffic light color is relevant to the vehicle 100. In this case, a signal group 201 may comprise all synchronized traffic lights or signal generators of a light signal installation 200. Entry with two different signal groups 201 is therefore available at an intersection having separately switched traffic lights for traffic turning left, on the one hand, and for driving straight ahead or traffic turning right, on the other hand.

The control unit 101 may be configured to provide the automatic mode of the UCC driving function, that is to say aUCC, possibly only at a light signal installation 200 having a single signal group 201. The manual mode of the UCC driving function, that is to say mUCC, can be provided to that effect at a light signal installation 200 having a plurality of different signal groups 201. In this case, the driver receives a suggestion for assistance with the longitudinal guidance via the user interface 107, which can then be accepted by the driver, possibly by actuating an operating element 412 of the user interface 107 (which results in automated braking at a red signal group 201, for example).

So that the driving function knows, when heading for a light signal installation 200, how many different signal groups 201 the light signal installation 200 has and which function form (aUCC or mUCC) can be used to react to the light signal installation 200, the number of signal groups 201 can be stored as a map attribute in the map data (that is to say in the digital map information). Since these map data may be erroneous in individual cases or the number of signal groups 201 may change as a result of conversion measures, a situation may arise in which the UCC driving function (on the basis of the map data) assumes a light signal installation 200 with only one signal group 201 for a signaling unit 200, 210 located ahead, but two different traffic light colors are detected on the basis of the environmental data.

If the map attributes relating to a signaling unit 200, 210 differ from that which is detected on the basis of the environmental data captured by the vehicle 100, this may be due to the fact that the map attributes are not correct or the environmental data are interpreted incorrectly (false positive). A false positive of the environmental data is often present only for a relatively short period.

In order to be able to exclude a false positive, the control unit 101 may be configured to repeatedly check the situation, in response to a detected difference or in response to a detected contradiction between environmental data and map data, before a vehicle reaction is given (in particular before an unavailability output is effected or before the driving function is operated in the manual mode). Repeated checking may possibly mean that the contradiction is resolved and an improved reaction of the driving function to the situation is therefore possible. This delayed reaction may be postponed until a decision time or until a decision position which is as close as possible to the detected signaling unit 200, 210 but still leaves sufficient time to still be able to safely react to the signaling unit 200, 210 in an automated manner and/or manually even after the delayed reaction.

If, when heading for a light signal installation 200 which has only one signal group 201 according to map data, the UCC driving function detects a plurality of different traffic light colors on the basis of the environmental data, the decision relating to whether braking can be carried out manually or automatically to the light signal installation 200 (that is to say whether mUCC or aUCC is carried out) can therefore be delayed. This is possible if the signal group difference is detected so early that it is still possible to safely react to the light signal installation 200 even after a delayed reaction. If a signal group difference is detected, there is for the time being no reaction of the driving function to the light signal installation 200 in this case. A decision regarding whether the driving function is operated in the automatic mode or in the manual mode can then be made only at the decision time or at the decision position, at which an mUCC offer would have to be output to the driver at the latest in order to comply with both a predefined minimum output duration of the offer and the necessary braking distance of the vehicle 100, within the framework of a maximum comfortable deceleration.

An mUCC offer is preferably output at the decision time if the difference or the contradiction of environmental data and map data is still present. On the other hand, if a difference can no longer be identified at the decision time, a (temporary) false positive of the environmental data can be assumed and the driving function can automatically (in the aUCC mode) adjust to the light signal installation 200.

The control unit 101 may therefore be configured to determine a decision time or a decision position before a detected signaling unit 200, 210, at which it is necessary to decide at the latest whether the UCC driving function is operated in the automatic mode or in the manual mode. If there is a contradiction between the environmental-data-based detection of the signaling unit 200, 210 and the map-data-based detection of the signaling unit 200, 210 at the decision time or at the decision position, the UCC driving function can be operated in the manual mode. If there is no contradiction, the UCC driving function can be operated in the automatic mode. The comfort and the safety of the UCC driving function can therefore be increased.

The control unit 101 may therefore be configured to flexibly decide whether the UCC driving function can be operated in the automatic mode or in the manual mode for a detected signaling unit 200, 210. The UCC driving function can therefore be operated in mixed operation with automated braking operations that are carried out automatically and with manual offers to carry out automated braking operations. In particular, automated braking can be carried out automatically on the basis of the complexity of a junction, for instance an intersection, or the need for driver confirmation before carrying out the automated braking may be identified.

In other words, the control unit 101 may be configured to flexibly decide, on the basis of the map data and on the basis of the environmental data, whether the UCC function should be operated in the automatic mode or in the manual mode at a detected signaling unit 200, 210. In particular, it is possible to decide whether or not a detected junction can be safely managed in an automated manner and/or whether or not the relevant signal group 201 can be determined for the vehicle 100.

If the UCC function is operated in the automatic mode and the signal group 201 relevant to the vehicle 100 has a color relevant to braking, automated braking can be initiated automatically (without confirmation by the driver of the vehicle 100). The automatic initiation of the automated braking can be communicated to the driver via the user interface 107, for instance via the instrument cluster.

If the intersection cannot be safely managed, the UCC function can be operated in the manual mode and an offer to carry out automated braking can be output (possibly optically) to the driver via the user interface 107, in particular via the instrument cluster. In particular, it is possible to indicate to the driver which traffic light color is considered to be relevant by the vehicle 100. Furthermore, it is possible to indicate to the driver which operating element 412 can be used to accept the offer. The driver can then possibly accept the offer (for example by actuating the operating element 412) and automated braking can then possibly be initiated and/or carried out with respect to the detected signaling unit 200, 210. If the offer is not accepted, the vehicle 100 can be longitudinally guided across the junction possibly in an automated manner (without the detected signaling unit 200, 210 being taken into account in the process).

The comfort, the safety and the availability of the UCC driving function can be increased by flexibly operating the UCC driving function in the automatic mode or in the manual mode (depending on the complexity of the detected signaling units 200, 210).

It may be possible for the driver of the vehicle 100 to configure the UCC driving function via the user interface 107. In this case, the driver can stipulate, for example, whether the UCC driving function is intended to be operated (if possible) in the automatic mode (aUCC) or whether the UCC driving function is intended to be fundamentally operated only in the manual mode (mUCC). The configuration or the change in the configuration can be carried out, for example, at a configuration time or at a configuration position (within the road or street network).

It may be the case that a driving function, in particular the UCC driving function, is already being operated with respect to a signaling unit 200, 210 at the configuration time or at the configuration position. The control unit 101 may be configured to take into consideration the change in the configuration of the driving function that is effected at the configuration time or at the configuration position during operation of the driving function only when the vehicle 100 is in a state in which the configuration changes do not cause an immediate vehicle reaction.

Within the scope of the UCC driving function, a configuration change, which could abort active braking to a particular signaling unit 200, 210, can possibly be adopted via the user interface 107 only when the active braking has been ended or when the active braking has been aborted as a result of other influences (for example as a result of an abort by the driver). The configuration change therefore affects only the next driving situation with a signaling unit 200, 210. If the UCC driving function is therefore deactivated (for instance by the passenger) during active traffic light braking to a traffic light 200, the vehicle 100 still brakes until coming to a standstill in front of the traffic light 200. The driving function is actually deactivated only after the braking.

In a further example within the context of the UCC driving function, it may be possible to possibly switch over from an automatic takeover (aUCC) to a manual takeover (mUCC) of a detected signaling unit 200, 210, while the function already adjusts to a particular signaling unit 200, 210. The change is then preferably carried out only after the adjustment which is already taking place has been completed, with the result that a manual offer is output only for a subsequently detected signaling unit 200, 210.

The control unit 101 may therefore be configured to check whether a signaling unit 200, 210 has already been detected for the UCC driving function and/or whether automated longitudinal guidance has already taken place with respect to a detected signaling unit 200, 210 at the configuration time or at the configuration position of a configuration change to the UCC driving function. If this is the case, the configuration change is possibly taken into consideration only for the directly following signaling unit 200, 210 (and not for the signaling unit 200, 210 which has already been detected and/or taken into consideration). In particular, the driving function can possibly be deactivated only after the automated longitudinal guidance with respect to the already detected signaling unit 200, 210 has been completed. Particularly safe operation of the UCC driving function can therefore be achieved.

As already explained above, the control unit 101 may be configured to detect a signaling unit 200, 210 located in front of the vehicle 100 in the direction of travel on the basis of the environmental data (and possibly on the basis of the map data). The color of a signal group 201 of the signaling unit 200, 210 may also be determined on the basis of the environmental data.

It may be the case (for example in the case of a relatively late change of the color of a signal group 201 from green to amber) that automated and/or manual braking can no longer be carried out (with particular, defined maximum deceleration) for a detected signaling unit 200, 210. In such a case, an unavailability output could be output to the driver of the vehicle 100 in order to indicate to the driver that no automated braking will be carried out for the detected signaling unit 200, 210. However, the output of an unavailability output, in particular an unavailability display, would typically not be useful in such a situation, since manual braking can or should no longer be carried out by the driver of the vehicle 100.

The control unit 101 may be configured to suppress an unavailability output if it is identified, only shortly before reaching the signaling unit 200, 210, that the signaling unit 200, 210 cannot be taken into consideration during the automated longitudinal guidance of the vehicle 100. In particular, the control unit 101 may be configured to check, at a time or at a position at which the unavailability of the assistance for a signaling unit 200, 210 is identified, whether the period before reaching the signaling unit 200, 210 corresponds to or falls below a particular period threshold value; and/or whether the distance 311 before reaching the signaling unit 200, 210 corresponds to or falls below a particular distance threshold value.

The period threshold value and/or the distance threshold value may each be dependent on the speed or independent of the speed in this case. The period threshold value and/or the distance threshold value may be defined in such a manner that, for periods of longer than the period threshold value and/or for distances of greater than the distance threshold value, manual braking of the vehicle 100 by the driver in order to stop the vehicle 100 at the detected signaling unit 200, 210 is still possible and/or useful. In this case, a maximum possible deceleration of the vehicle 100 and/or a predefined reaction time of the driver may be taken into consideration, for example.

The control unit 101 may be configured to prevent the output of an unavailability output if it is determined that the period before reaching the signaling unit 200, 210 corresponds to or falls below the particular period threshold value; and/or the distance 311 before reaching the signaling unit 200, 210 corresponds to or falls below the particular distance threshold value.

On the other hand, the unavailability output can be output.

The control unit 101 may therefore be configured to cause no unavailability display to be output as a result of a detection error and/or as a result of a traffic light that switches late to amber in a region that is not relevant to the driver before reaching the traffic light 200 (in particular because manual braking is no longer useful), since the output of such an unavailability display would be an additional disruptive factor for the driver.

In particular, it is possible in this case to cause no unavailability display to be output at a particular distance x 311 in [m] and/or at a particular interval of time in [s] before reaching the traffic light 200. In this case, the minimum distance x to the stopping position of the traffic light 200 may be independent of the speed and may possibly represent a lower limit. Below this distance value, the unavailability display is then possibly fundamentally not displayed. The temporal criterion may be dependent on the speed. This criterion may then cause the unavailability display to not be output, in particular in the case of relatively high speed ranges. The comfort of the driving function for the driver of the vehicle 100 can be increased by suppressing the output of the unavailability display.

As already explained above, the UCC driving function can be operated in a manual mode in which an offer to assist with the longitudinal guidance at a detected signaling unit 200, 210 is output to the driver of the vehicle 100. The driver of the vehicle 100 then has the opportunity to accept the offer (for example by actuating the set operating element 212). If the offer is accepted, automated braking, for example, may be carried out if necessary at the detected signaling unit 200, 210.

It may be the case, for example if the vehicle 100 is driving on a straight road, that the next signaling unit 200, 210 located ahead is already detected at a relatively great (temporal and/or spatial) distance 311 before reaching the signaling unit 200, 210 (on the basis of the environmental data). At that moment, the detected signaling unit 200, 210 may possibly still be irrelevant to the longitudinal guidance of the vehicle 100 and/or to the driver of the vehicle 100. An output to the driver of the vehicle 100, for example relating to an offer to assist with the automated longitudinal guidance at the detected signaling unit 200, 210, could be perceived to be disruptive and/or irritating by the driver.

It may also be the case that the signaling unit 200, 210 is concealed at a later time and is therefore no longer detected. This could result in the offer to the driver being withdrawn and therefore in confusion of the driver.

The control unit 101 may be configured to determine whether the (spatial and/or temporal) distance 311 from a detected signaling unit 200, 210 is equal to or greater than an output threshold value. The control unit 101 may also be configured to effect an output relating to the detected signaling unit 200, 210 (for example an offer to take the detected signaling unit 200, 210 into consideration during the automated longitudinal guidance) only when the (spatial and/or temporal) distance 311 from the detected signaling unit 200, 210 is equal to or less than the output threshold value.

The control unit 101 may therefore be configured to take into consideration a required minimum output distance from a detected signaling unit 200, 210. A lack of a condition with respect to a minimum output distance could irritate the driver since implausible changes with respect to an offer to assist with the automated longitudinal guidance at the detected signaling unit 200, 210 could be displayed on the screen 400 (for example in the instrument cluster and/or in the head-up display) even though the signaling unit 200, 210 (for example a red traffic light) is not (yet) relevant to the driver. Such changes could be caused, for example, by uncertainties during camera detection (on account of the relatively great distance).

The control unit 101 may be configured to output an offer with respect to a signaling unit 200, 210 only when a particular distance from the signaling unit 200, 210 is undershot. In this case, there is possibly no display if the vehicle 100 is in the xth row (where x>1) in front of the signaling unit 200, 210. Incorrect and/or implausible displays can therefore be eliminated. The control unit 101 may therefore be configured to suppress the output of an offer as long as the predefined output distance 311 from the signaling unit 200, 210 is not undershot. The comfort for the user can therefore be increased.

The control unit 101 may be configured, after the assistance with the longitudinal guidance of the vehicle 100 at a first signaling unit 200, 210 has ended, to sequentially search for a (directly) following, second signaling unit 200, 210 which can or should be taken into consideration during the longitudinal guidance of the vehicle 100. In particular, within the scope of the mUCC driving function, after the braking process at a first signaling unit 200, 210 has been completed, a suggestion to take into consideration a following, second signaling unit 200, 210 can be output. Alternatively, within the scope of the aUCC driving function, after the braking process at a first signaling unit 200, 210 has been completed, the following, second signaling unit 200, 210 (and possibly automated braking associated therewith) can be automatically taken into consideration.

The detection of a following, second signaling unit 200, 210 may be impaired, in particular when starting up at a traffic light (that is to say at a first signaling unit 200, 210) (for example because the environmental data sometimes still indicate information relating to the first signaling unit 200, 210). This may result in an implausible behavior of the driving function for the driver of the vehicle 100.

The control unit 101 may be configured to determine the period and/or the spatial distance since the vehicle 100 was started up at the first signaling unit 200, 210. The output of an offer to take into consideration a following, second signaling unit 200, 210 and the automatic consideration of a following, second signaling unit 200, 210 may be suppressed as long as the period is less than or equal to a period threshold value; and/or as long as the spatial distance of the vehicle 100 from the
  first signaling unit 200, 210 is less than or equal to a
  distance threshold value; and/or as long as the driving speed of the vehicle 100 is less than
  or equal to a speed threshold value.

The control unit 101 may therefore be configured, after
the vehicle 100 has been started up, to suppress all manual
and/or automatic offers to take signaling units 200, 210 into
consideration for a defined period. Alternatively or addition-
ally, it may be necessary for a minimum speed of the vehicle
100 to be exceeded in order to allow a manual and/or
automatic offer.

In particular, after the vehicle 100 has been started up, it
is possible to start an inhibit time which suppresses all offers
until a defined time after the beginning of the "driving" state.
Furthermore, no offers are possibly output until a defined
speed. The comfort of the driving function can therefore be
increased further.

As explained further above, the vehicle 100 may comprise
one or more driver sensors 108 which are configured to
capture driver data (that is to say sensor data) relating to the
driver of the vehicle 100. The UCC driving function can be
operated on the basis of the driver data. In particular, an
output of information to the driver of the vehicle 100 may be
effected or possibly prevented on the basis of the driver data.

The control unit 101 of the vehicle 100 may be configured
to determine, on the basis of the driver data, whether or not
the driver is sufficiently attentive with respect to the driving
task or with respect to the monitoring of the driving func-
tion. The control unit 101 may also be configured to supple-
ment an unavailability display displayed on the screen 400
of the user interface 107 by outputting an optical and/or
haptic signal if it is determined that the driver is not
sufficiently attentive. The comfort and the safety of the UCC
driving function can therefore be increased.

The unavailability display can be output, for example, if
it is identified that the driving function (for example on
account of the late detection of a traffic light, on account of
late switching of the traffic light to amber, on account of a
concealed camera 103, etc.) can no longer react in good time
to the traffic light (and therefore automated braking at the
traffic light is not available). The unavailability display can
be displayed, for example, in the instrument cluster and/or in
the head-up display. If the driver is inattentive at the time at
which the unavailability display is output, this could result
in the driver overlooking the optical indication (and still
assuming that the traffic light 200 is taken into consideration
during the automated longitudinal guidance).

In addition to the optical indication, an acoustic signal, for
example, can therefore be output to the driver identified as
inattentive in order to request the driver to be attentive.
Alternatively or additionally, a steering wheel vibration
and/or activation of light strips on the steering wheel can be
effected. This makes it possible to ensure that the traffic
light, for which the unavailability display is displayed, is not
overlooked by the driver.

The state of the driver can be determined on the basis of
the sensor data from an interior camera 108 by means of a
driver model. If it is identified that the driver is inattentive,
a sound can be output in addition to the unavailability
display. Alternatively or additionally, additional haptic or
further optical feedback can be effected.

During operation of a driving function, in particular a
driver assistance function, there may be a change in the
driving behavior of the vehicle 100. For example, the
driving function may automatically abort a braking process
which has already been initiated, for example in order to accelerate the vehicle 100 again. This may be carried out, for
example, within the scope of the UCC driving function if,
during automated braking at a light signal installation 200
with a red signal group 201, the signal group 201 changes to
green. The change in the driving behavior of the vehicle 100,
which is caused by the driving function, may be perceived
to be unsettling and/or uncomfortable by the driver of the
vehicle 100, in particular when the driver of the vehicle 100
is inattentive.

The control unit 101 may be configured to determine that
the driving behavior of the vehicle 100 that is caused by the
driving function of the vehicle 100 has changed substantially
or will change substantially at a particular change time.
Furthermore, the control unit 101 may be configured to
determine, on the basis of the driver data from the one or
more driver sensors 108, that the driver of the vehicle 100
is inattentive with respect to the driving task at the change
time. In response to this, it is possible to cause information
relating to the change in the driving behavior to be output to
the driver of the vehicle 100 (for example via an optical
and/or acoustic output). The comfort for the driver of the
vehicle 100 can therefore be increased.

The UCC driving function is typically designed as a
driving function according to SAE level 2. In the case of
such a driving function, in particular in the case of such a
driver assistance system, the driver is assisted only with the
(longitudinal) guidance of the vehicle 100 and must still be
able to act himself at any time. The driving function may be
designed such that, in a situation in which the driving
function changes the driving behavior of the vehicle 100 in
such a manner that the driver must react or should at least
monitor the vehicle 100 with an increased level of atten-
tiveness, information relating to the change in the driving
behavior is output.

The control unit 101 may therefore be configured, if the
driving function significantly changes its form, for example
aborts braking and accelerates to free travel again, to opti-
cally and/or acoustically and/or haptically inform a driver
identified as inattentive about the change.

If the UCC driving function automatically brakes to a
traffic light 200 and the latter changes from red to green
during control, the control unit 101 can cause the UCC
driving function to abort the braking and to change to free
travel or follow-on travel (if a vehicle driving in front is
present), in particular when the driver is identified as atten-
tive via the interior camera 108. If the driver is not identified
as attentive in this situation, the driver can be made aware
of the changed conditions acoustically and/or optically, for
example via a gong. For reasons of safety, the braking can
then be continued despite the green traffic light until the
driver is identified as attentive again. The safety of the
driving function can therefore be increased further.

A further example within the context of the UCC driving
function is the unavailability display. If a red traffic light 200
is only detected so late that braking is no longer possible (in
an automated manner) taking into consideration the func-
tional limits of the driving function, the driving function
typically does not start braking and an unavailability display
is displayed to the driver instead. If the driver does not
independently brake in this situation, a red traffic light 200
could be driven through. For this reason, the driver's atten-
tiveness can be checked (in particular via the interior camera
108) (in particular simultaneously) with the output of the
unavailability display. If the driver is detected as inattentive,
it is possible to output an acoustic gong which makes the
driver aware that no braking is being carried out by the UCC
driving function and a driver reaction is necessary under certain circumstances. The safety and the comfort of the driving function can therefore be increased.

The control unit 101 of the vehicle 100 may be configured to adapt the deceleration and/or acceleration, in particular the temporal profile of the deceleration and/or the acceleration, of the vehicle 100 that is automatically effected within the scope of a driving function, in particular within the scope of the UCC driving function, on the basis of the driver data, in particular on the basis of the detected degree of attentiveness of the driver. The comfort and the safety of the driving function can therefore be increased.

Monitoring the driver's attentiveness makes it possible to design the profile of braking of the vehicle 100 in such a manner that the driver is made aware of the beginning of an automated braking maneuver by virtue of the resulting vehicle movement. It is therefore possible to achieve the situation in which the driver of the vehicle 100 monitors the automated braking with an increased degree of probability. For example, braking may be started with a jolt, as a result of which a haptic signal to the driver (identified as inattentive) is effected as a suggestion to focus attention on the driving task.

Alternatively or additionally, the temporal profile of a deceleration and/or acceleration of the vehicle 100 may depend on a driving mode that has been set (for example sporty, comfort and/or energy-saving). For example, it may be possible (for example in a sport mode) to start the deceleration of the vehicle 100 at a later time and/or to carry it out with an increased deceleration value if the driver of the vehicle 100 is identified as attentive. The comfort and the safety of a driving function can therefore be increased.

The control unit 101 may be configured (in particular on the basis of the environmental data and/or on the basis of the map data) to determine the type of the signaling unit 200, 210 (from a predefined set of different types). Exemplary types are a light signal installation 200 or a traffic sign 210. Alternatively or additionally, the control unit 101 may be configured (in particular on the basis of the environmental data and/or on the basis of the map data) to predict period information relating to the period for which the vehicle 100 must probably stop at the signaling unit 200, 210 located ahead before the vehicle 100 can start up again. It is therefore possible to determine (on the basis of the map data and/or the environmental data) stopping information relating to the stopping of the vehicle 100 at the signaling unit 200, 210 located ahead.

The automated deceleration of the vehicle 100 at the signaling unit 200, 210 located ahead can then be effected on the basis of the period information and/or on the basis of the type of the signaling unit 200, 210 (that is to say on the basis of the stopping information). In particular, the temporal profile of the deceleration and/or the total duration of the deceleration process can be adapted or defined on the basis of the period information and/or on the basis of the type of the signaling unit 200, 210 (that is to say on the basis of the stopping information). For example, a relatively slow deceleration process may be selected at a light signal installation 200 having a red signal group 201 (since the vehicle 100 must wait until the signal group 201 changes to green). On the other hand, a relatively fast deceleration process can be selected at a stop sign 210 since the vehicle 100 can possibly drive on immediately after stopping (if the traffic on the crossing traffic route allows). The comfort of the driving function can be increased by adapting the deceleration profile.

Within the scope of the UCC driving function, control is generally effected until the vehicle 100 comes to a standstill.

In this case, as explained above, a different deceleration profile can be used depending on the type of the signaling unit 200, 210. In particular, the automated braking to a traffic light 200 may differ in this case from the automated braking to a stop sign 210 (because the driver can possibly drive on immediately after stopping at a stop sign 210).

Alternatively or additionally, the driving style, in particular the deceleration or the deceleration characteristic, of the vehicle 100 may be selected by the user of the vehicle 100 using a driving experience switch. At the request of the driver using the driving experience switch (for example eco, comfort, sport, etc.), the driving function can assume different deceleration profiles to traffic lights 200 and/or stop signs 210. The different deceleration profiles can be effected by adapting one or more parameters when planning the trajectory of the vehicle 100.

The comfort and the safety of the driving function can be increased by adapting the deceleration profile of the UCC driving function to the type of the signaling unit 200, 210. In particular, impairment of the following traffic can be avoided, which could arise, for example, in the case of an excessively slow deceleration in front of a stop sign 210.

Within the scope of the UCC driving function, a signaling unit 200, 210 which is located ahead on the road used by the vehicle 100 and at which the vehicle 100 must stop can be displayed to the driver of the vehicle 100 via the user interface 107, in particular on the screen 400. For example, the symbol of a red traffic light or of a stop sign may be displayed on the screen 400. Alternatively or additionally, it is possible to effect an acoustic output with respect to the detected signaling unit 200, 210. An automated braking process of the vehicle 100 to a standstill at the signaling unit 200, 210, in particular up to the stop line of the signaling unit 200, 210, can then be effected automatically (aUCC) or after confirmation by the driver (mUCC).

The control unit 101 may be configured to monitor (on the basis of the captured environmental data) the (signaling) state, in particular the color, of that signal group 201 of the signaling unit 200, 210 which is relevant to the vehicle 100, while the vehicle 100 is at the signaling unit 200, 210. The control unit 101 may also be configured to change or completely delete or withdraw the display relating to the signaling unit 200, 210 (and/or to effect an acoustic output) if a phase change of the signal group 201 from red to green is detected and/or as soon as the vehicle 100 has come to a standstill at the signaling unit 200, 210. The driver of the vehicle 100 can therefore be clearly informed that the signaling unit 200, 210 is no longer relevant to the longitudinal guidance of the vehicle 100. The display can be withdrawn in the automatic mode and/or in the manual mode of the UCC driving function.

Furthermore, it may be possible for the driver of the vehicle 100 to cause the vehicle 100 to be started up at the signaling unit 200, 210 (in particular after a detected phase change from red to green) using an operating element 413 (for example using the resume button) of the user interface 107. In particular, it may be possible for the driver to cause the vehicle 100 to be accelerated again to the set or target speed that has been set (taking into consideration a set target distance from a leading vehicle) by actuating the operating element 413. The starting-up at the signaling unit 200, 210 by actuating the (resume) operating element 413 can be enabled in the automatic mode and/or in the manual mode of the UCC driving function.

In addition, the starting-up after the standstill at the signaling unit 200, 210 can be effected by actuating the accelerator pedal of the vehicle 100. However, this may possibly result in the UCC driving function being aborted. The starting-up using an operating element 413 (in particular using a button) of the user interface 107 therefore makes it possible to comfortably continue the UCC driving function at a sequence of successive signaling units 200, 210 (in the automatic mode and/or in the manual mode of the UCC driving function).

In particular, the UCC driving function may be designed in such a manner that, in the case of a (possibly manually confirmed) traffic light 200 (mUCC), after a standstill and after a detected change to green, the display relating to the traffic light 200 is withdrawn. Furthermore, it may be possible for the driver to start up the vehicle using the button 413. The comfort of the UCC driving function can therefore be increased. In addition, it is thus possible to achieve a consistent behavior with the ACC driving function (at a standstill without a leading vehicle). The control unit 101 may be configured, in the case of a (possibly manually confirmed) traffic light 200, from the beginning of the detection of a phase change to green, to cause a timer to be activated, which timer causes the red display relating to the traffic light 200 to be removed after the vehicle 100 is at a standstill.

The control unit 101 of the vehicle 100 may be configured to block or prevent the vehicle 100 from being started up at a signaling unit 200, 210 in response to the actuation of an operating element 411, 412, 413 of the user interface 107 if it is identified that the vehicle 100 is arranged in the first row at the signaling unit 200, 210. In other words, the starting-up by actuating an operating element 411, 412, 413 of the user interface 107 may possibly be enabled only when at least one other leading vehicle 100 is in front of the vehicle 100 at the signaling unit 200, 210. The safety of the UCC driving function can therefore be increased. In particular, it is therefore possible to reliably prevent the driver of the vehicle 100 from causing the starting-up at a (possibly red) traffic light 200 by unwittingly actuating an operating element 411, 412, 413 of the user interface 107 (in particular the rocker 411 and/or a button 412, 413).

It is therefore possible to reliably prevent the driver from unwittingly initiating start-up when at a standstill at a red traffic light 200 by virtue of the driver adjusting the set speed via the rocker 411 or confirming a limit offer with the set button 412, for example. It is also possible to prevent actuation of a button by the driver resulting in the vehicle 100 starting up again and accelerating to the set speed. This can be achieved, in particular, by virtue of the fact that the transition from the state "vehicle stationary" to the state "starting-up" as a result of driver actuation of an operating element 411, 412, 413 is not possible or is blocked as long as the vehicle 100 is in the first row in front of a traffic light 200 relevant to stopping. Actuation of an operating element 411, 412, 413 is therefore ineffective.

The control unit 101 of the vehicle 100 may be configured to determine whether or not the vehicle 100 is in the first row at a signaling unit 200, 210 on the basis of the environmental data and/or on the basis of the position data (in conjunction with the map data). In particular, the distance of the vehicle 100 from the stopping point or to the stop line of the signaling unit 200, 210 can be determined. It is then possible to determine whether or not the vehicle 100 is in the first row on the basis of the determined distance.

It may be the case that the state of the signaling unit 200, 210, in particular the color of a signal group 201 of the signaling unit 200, 210, cannot be detected or cannot be reliably detected on the basis of the environmental data from the one or more environmental sensors 103 of the vehicle 100. This could result in reduced availability of the UCC driving function.

The control unit 101 may be configured to detect the leading vehicle driving (directly) in front of the vehicle 100 on the basis of the environmental data. The UCC driving function, in particular the automated longitudinal guidance of the vehicle 100, can then be carried out or provided at the signaling unit 200, 210 on the basis of the driving behavior of the leading vehicle. The availability and therefore the comfort of the driving function can be increased by taking into consideration the driving behavior of the leading vehicle during operation of the UCC driving function.

During operation of the UCC driving function, it may be the case, for example, that it is possible to only inadequately detect the color of a traffic light 200 as a result of concealment or poor light conditions. Furthermore, in the case of a complex intersection geometry (with different signal groups 201) it may possibly not be possible to assign the different signal groups 201 to the individual directions of travel. In order to increase the degree of automation of the longitudinal control function and consequently in order to increase the comfort for the driver, the behavior of the leading vehicle may possibly also be evaluated, in addition to the traffic light colors and/or the attributes of a signaling unit 200, 210 from the map data, and may be taken into consideration during operation of the driving function.

If the leading vehicle drives through, for example, the traffic light 200 located ahead, which could potentially be green, the leading vehicle may possibly be followed. In particular, automated braking may possibly be canceled as long as a potentially relevant green traffic light is detected on the basis of the environmental data. In other words, the control unit 101 may be configured to detect, on the basis of the environmental data, whether at least one of the signal groups 201 of the light signal installation or traffic light 200 located ahead has a green color. If this is the case and if it is identified (on the basis of the environmental data) that the leading vehicle driving (directly) in front of the vehicle 100 drives through the light signal installation 200, it is possible to cause the vehicle 100 to also drive through the light signal installation 200 (even though it could not be clearly determined on the basis of the environmental data and the map data whether the signal group 201 with the green color is relevant to the direction of travel of the vehicle 100). The availability of the driving function can be safely increased by means of such consideration of the driving behavior of the leading vehicle.

Alternatively or additionally, if the traffic light 200 is lost sight of when the vehicle 100 is at a standstill and in the case of a leading vehicle starting up, the control unit 101 may be configured to assume that the traffic light 200 has changed from red to green (or is switched off in the case of pedestrian-operated traffic lights). An automated start-up process of the vehicle 100 can then be effected if appropriate. In other words, the control unit 101 may be configured to identify that the leading vehicle (directly) in front of the vehicle 100 at a signaling unit 200, 210 is starting up. Automated starting-up of the vehicle 100 can then be effected even without detecting the (signaling) state of the signaling unit 200, 210 (possibly only after actuation of an operating element 411, 412, 413 by the driver of the vehicle 100). The availability of the UCC driving function can therefore be safely increased.

The driver of the vehicle 100 typically has the possibility of overriding the automated longitudinal guidance of the UCC driving function by actuating the accelerator pedal and/or the brake pedal. The detected actuation of the accelerator pedal and/or of the brake pedal may possibly also be used to end the UCC driving function. However, the automatic ending of the UCC driving function in response to detected actuation of the accelerator pedal and/or of the brake pedal of the vehicle 100 may result in reduced comfort and/or in reduced safety of the UCC driving function.

For example, it may be the case that the stopping position of the vehicle 100 at a signaling unit 200, 210, in particular at the stop line of a signaling unit 200, 210, is perceived by the driver of the vehicle 100 as being too far in front of the signaling unit 200, 210 (in particular if the vehicle 100 is in the first row in front of the stop line and therefore does not have a leading vehicle). In such a case, the driver might be inclined to drive the vehicle 100 closer to the stop line by actuating the accelerator pedal, which, however, could result in the UCC driving function being aborted and/or as a result of which automated starting-up within the scope of the driving function is possibly prevented.

In a further example, the driver of the vehicle 100 might be inclined to change from the standstill in a first lane in front of a traffic light 200 to an adjacent lane (for example in order to reduce the distance to the stop line). For this purpose, the driver would actuate the accelerator pedal in order to drive the vehicle 100 to the adjacent lane. This could result in the UCC driving function being aborted and could therefore result in a lack of longitudinal guidance assistance when subsequently starting up at the traffic light 200.

It could also be the case that a signaling unit 200, 210 detected by the UCC driving function is not taken into consideration during the automated longitudinal guidance of the vehicle 100 (and is possibly driven through without automated braking) if the driver actuates the accelerator pedal (and therefore the assistance of the UCC driving function is ended) at the time at which the signaling unit 200, 210 is detected.

On the other hand, it should be possible for the driver of the vehicle 100 to reliably and comfortably override (in particular by actuating the accelerator pedal) the UCC driving function, for example in the case of false braking of the driving function.

The control unit 101 may be configured to determine deflection information relating to the deflection, in particular relating to the extent of the deflection, of the accelerator pedal. The deflection information may be determined, for example, on the basis of an accelerator pedal sensor of the vehicle 100. Alternatively or additionally, the control unit 101 may be configured to determine time information relating to the duration for which the accelerator pedal is actuated. It is then possible to determine, on the basis of the deflection information and/or on the basis of the time information, whether or not the assistance of the automated longitudinal guidance of the vehicle 100 is provided at a signaling unit 200, 210 and/or whether or not the driving function is ended.

In particular, the control unit 101 may be configured to determine, on the basis of the deflection information, whether the deflection of the accelerator pedal is greater than or less than a deflection threshold value (for example of 25% of the maximum possible deflection of the accelerator pedal). Furthermore, the control unit 101 may be configured to determine, on the basis of the time information, whether the duration for which the accelerator pedal is deflected is greater than or less than a time threshold value (for example of 4 seconds).

The control unit 101 may be configured to allow actuation of the accelerator pedal, without ending the UCC driving function, if it is determined that the deflection of the accelerator pedal is less than or equal to the deflection threshold value; and the duration for which the accelerator pedal is actuated is less than or equal to the time threshold value.

On the other hand, the UCC driving function can be dropped or ended if it is determined that the deflection of the accelerator pedal is greater than the deflection threshold value; or the duration for which the accelerator pedal is actuated is greater than the time threshold value.

In this case, the dropping or aborting can possibly relate only to the next signaling unit 200, 210 which follows the actuation of the accelerator pedal. The UCC driving function can therefore possibly be only temporarily dropped or temporarily ended (only for the signaling unit 200, 210 which directly follows the actuation of the accelerator pedal).

The comfort and/or the safety of the UCC driving function can therefore be increased. In particular, it may thus be possible for the driver of the vehicle 100 to drive the vehicle 100 closer to the stop line and/or to an adjacent lane in front of a signaling unit 200, 210 by (lightly) actuating the accelerator pedal (without the automated assistance of the UCC driving function, for instance for the subsequent starting-up of the vehicle 100, being ended in the process). Furthermore, it is thus possible to achieve the situation in which a detected signaling unit 200, 210 is taken into consideration during the automated longitudinal guidance of the vehicle 100 even if the driver actuates the accelerator pedal for a short time and relatively lightly (while the signaling unit 200, 210 is detected). Furthermore, it may therefore be possible to comfortably and safely override an intervention of the UCC driving function.

The driving function can therefore be designed in such a manner that, (only) if a particular accelerator pedal angle is exceeded, the driving function in is immediately dropped. Furthermore, the driving function can be dropped if a particular time threshold value for the actuation of the accelerator pedal is exceeded (even if the deflection threshold value is not exceeded). On the other hand, the time before reaching the time threshold value can be used by the driver to cautiously approach the stop line of an intersection.

Furthermore, the driving function may be designed in such a manner that the driving function is not dropped if a traffic light 200 is detected while the accelerator pedal is depressed. Unreactive driving through the traffic light 200 can therefore be reliably prevented.

When at a standstill at a red traffic light 200, it may be the case that the driver drives off by actuating the accelerator pedal when the traffic light 200 changes to green because the change to green has not yet been detected by the UCC driving function (for example on account of latencies and/or on account of the color change not being detected). The actuation of the accelerator pedal could result in the UCC driving function being aborted (and therefore in an associated takeover request (TOR) being output). This can be perceived as disruptive by the driver of the vehicle 100.

The control unit 101 may be configured to determine speed data relating to the driving speed of the vehicle 100 during a start-up process which is effected by the driver of the vehicle 100 by actuating the accelerator pedal. Furthermore, the control unit 101 may be configured to take over the automated longitudinal guidance from the driver as long as the driving speed caused by the actuation of the accelerator pedal has not yet exceeded a predefined speed threshold value. The output of a TOR and/or the aborting of the UCC driving function can therefore be suppressed and/or prevented until the speed threshold value is reached (and the longitudinal guidance can be taken over by the driving function). On the other hand, the TOR can be output and/or the UCC driving function can be aborted if (in particular as soon as) the speed threshold value (for example 10 km/h) is reached or exceeded. The comfort for the driver of the vehicle 100 can therefore be increased further.

The control unit 101 may be configured to determine a driving mode, in which the vehicle 100 is operated, from a plurality of different driving modes. Exemplary driving modes are

- a sport driving mode in which the vehicle 100 has relatively high driving dynamics with relatively high acceleration and/or deceleration values;
- a comfort driving mode in which the vehicle 100 has a particularly comfortable driving style with relatively low acceleration and/or deceleration values; and/or
- an eco driving mode in which the vehicle 100 has a particularly energy-saving driving style.

The driving mode can be set by the user of the vehicle 100, for example via the user interface 107, for example using one or more operating elements of the user interface 107.

The control unit 101 may also be configured to operate the UCC driving function on the basis of the driving mode that has been set. In particular, the driving behavior, for instance the deceleration behavior, of the vehicle 100 in relation to a signaling unit 200, 210 located ahead can be adapted on the basis of the driving mode. For example, the time from which the vehicle 100 reacts to a detected signaling unit 200, 210 (at which the vehicle 100 is intended to stop) can be adapted on the basis of the driving mode. In the eco driving mode, a particularly early reaction of the vehicle 100 can be effected, for example, whereas, in the comfort driving mode, a reaction is effected only later and, in the sport driving mode, the reaction is effected even later.

Alternatively or additionally, the type or kind of reaction of the vehicle 100 to a detected signaling unit 200, 210 to be taken into consideration can be adapted on the basis of the driving mode that has been set. Exemplary types or kinds of reaction are:

- coasting operation of the vehicle 100, in which the wheels of the vehicle 100 are decoupled from the drive motor of the vehicle 100. If appropriate, the drive motor can then be deactivated;
- towing operation of the vehicle 100, in which the wheels of the vehicle 100 drag the drive motor along, which results in a towing deceleration of the vehicle 100; and/or
- active (friction and/or regenerative) braking operation, in which a braking torque on one or more wheels of the vehicle 100 is actively effected (for example by means of a friction brake and/or by means of an electric machine).

In the eco driving mode, for example when approaching a signaling unit 200, 210, it is possible to change first of all to coasting operation, then to towing operation and finally to braking operation. In the comfort driving mode, it may be possible to possibly dispense with coasting operation and for towing operation to be initiated directly and subsequently braking operation. In the sport driving mode, it may be possible to possibly dispense with coasting operation and towing operation and for braking operation to be initiated directly.

The deceleration behavior of the vehicle 100 when approaching a signaling unit 200, 210 can consequently be adapted to the driving mode that has been set. The comfort of the vehicle 100 can therefore be increased further.

The control unit 101 may therefore be configured to vary the (output) time for the reaction to a traffic light on the basis of the driving mode that has been set. In the eco driving mode, the traffic light control can be started relatively early, for example with an operation sequence: coasting operation, towing operation and braking operation. In the comfort driving mode, a middle starting time can be selected for the traffic light control, for example with an operation sequence: towing operation and braking operation. In the sport driving mode, the traffic light control can begin relatively later, for example directly with braking operation.

The traffic light control (in particular the deceleration profile of the vehicle 100) can be made particularly comfortable by adapting it to the driving mode. Furthermore, an anticipatory driving style can be represented "by reducing speed early", which, inter alia, reduces the dynamics to a stationary target object in advance. A gain in comfort and safety can therefore be achieved for the driver of the vehicle 100. A (driving and/or deceleration) characteristic respectively adapted to the driving mode can be set on the basis of the driving mode (for example eco, comfort and sport). This may enable particularly harmonious interaction between the ACC function and the UCC driving function.

As already explained further above, the vehicle guidance system 101 may be configured to determine a degree of complexity for a signaling unit 200, 210 located ahead. The degree of complexity, in particular the value of the degree of complexity, may be determined in this case on the basis of the map data relating to the signaling unit 200, 210. The map data may comprise one or more attributes, for example the number of different signal groups of the signaling unit 200, 210.

It may be the case that the map data for a signaling unit 200, 210 located ahead do not comprise any attributes from which the complexity of the signaling unit 200, 210 can be inferred. In order to nevertheless be able to provide an automatic mode of the driving function, the vehicle guidance system 101 may be configured to determine the complexity, in particular the degree of complexity, for the signaling unit 200, 210 on the basis of environmental information, wherein the environmental information describes the environment of the signaling unit 200, 210. In this case, the environmental information may be determined on the basis of the map data and/or on the basis of the environmental data.

Exemplary environmental information is

- the number of lanes of the street or road which leads to the junction with the signaling unit 200, 210;
- the type of street which leads to the junction; exemplary street types are: a highway, a street in a city, a (private) road, etc.
- a type of junction at which the signaling unit 200, 210 is arranged; exemplary types of junctions are: a T-intersection, a four-way intersection, a traffic circle, etc., and/or
- the number of outgoing streets which leave the junction (and are therefore available as possible directions of travel for the vehicle 100 at the junction).

Furthermore, it is possible to check, on the basis of the map data, whether or not the signaling unit 200, 210 is actually recorded in the map data.

The vehicle guidance system 101 may be configured to operate the (UCC) driving function on the basis of the environmental information relating to the environment of the signaling unit 200, 210. For example, it is possible to determine, on the basis of the environmental information, whether the approach to the signaling unit 200, 210 has one or more lanes. If the approach has only one lane, it is possible to determine that the signaling unit 200, 210 has a relatively low degree of complexity, and the driving function can possibly be operated in the automatic mode (possibly even if no map attribute for the number of different signal groups of the signaling unit 200, 210 is available). The prerequisite for operation in the automatic mode may be that the signaling unit 200, 210 is actually recorded in the map data.

If, on the other hand, the approach to the signaling unit 200, 210 has a plurality of lanes (and/or the signaling unit 200, 210 is not recorded in the map data), it is possible to determine that the signaling unit 200, 210 has a relatively high degree of complexity, and the driving function may possibly be operated only in the manual mode.

Alternatively or additionally, the environmental information may comprise information relating to the complexity of the street network in the environment of the signaling unit 200, 210. In this case, the environmental information may be determined on the basis of one or more attributes of the map data (for the environment of the signaling unit 200, 210) and/or on the basis of a geometrical evaluation of the map data. The environmental information may indicate, for example, whether there is a tunnel on the approach to the signaling unit 200, 210 and/or on the road leading away from the signaling unit 200, 210; this environmental information may be indicated by a map attribute, for example;

whether the approach to the signaling unit 200, 210 is an access ramp (for example to a freeway); this environmental information may be indicated by a map attribute, for example;

whether there is a bypass lane, which possibly leads past the signaling unit 200, 210, at the junction of the signaling unit 200, 210; this environmental information may be determined, for example, by means of a geometrical evaluation of adjacent topological junctions; and/or whether there is a relatively high density of signaling units 200, 210 and/or junctions in the environment of the signaling unit 200, 210 (for example along the route of the vehicle 100), for example a relatively large number of junctions which follow one another at a relatively short distance.

The above-mentioned environmental information may indicate a relatively high complexity of the street situation in the environment of the signaling unit 200, 210. A relatively high degree of complexity for the signaling unit 200, 210 may be inferred on the basis thereof (possibly even if a map attribute of the signaling unit 200, 210 indicates that the signaling unit 200, 210 has only a single signal group). If there is a relatively high degree of complexity (that is to say a degree of complexity which exceeds a particular complexity threshold value), the automatic mode of the driving function may be prevented (and possibly only the manual mode may be enabled).

The degree of complexity, in particular the value of the degree of complexity, of the signaling unit 200, 210 can be determined with increased accuracy and/or reliability by evaluating available information relating to the environment of a signaling unit 200, 210. The comfort of the driving function can therefore be increased. In particular, the availability of the automatic mode of the driving function may therefore be increased.

As already explained above, the vehicle guidance system 101 may be configured to longitudinally guide the vehicle 100 in an automated manner behind a leading vehicle (and to therefore carry out follow-on travel). In particular, the vehicle guidance system 101 may cause the vehicle 100 to stop at a detected signaling unit 200, 210 while the vehicle 100 is carrying out follow-on travel behind a leading vehicle. On the basis of the signaling state (for example the color "red"), it may have been determined that the vehicle 100 must stop at the signaling unit 200, 210, in particular at a stop line of the signaling unit 200, 210. The vehicle 100 can then be stopped on the basis of the leading vehicle, in particular in such a manner that the vehicle 100 stops behind the leading vehicle at the stop line of the signaling unit 200, 210.

During the approach to the signaling unit 200, 210, it may be the case that a stop line is detected on the basis of the environmental data. Since the stop line of the lane used by the vehicle 100 is typically concealed by the leading vehicle during follow-on travel, the detected stop line may be, with a relatively high degree of probability, a stop line in an adjacent lane, in particular when the stop line is detected within a particular distance range or time range before reaching the signaling unit 200, 210. In this case, the detected stop line may be arranged at a position between the current position of the vehicle 100 and the position of the signaling unit 200, 210.

The vehicle guidance system 101 may be configured to check whether or not the vehicle 100 is already within a predefined time range or distance range in front of the signaling unit 200, 210 at the detection time or at the detection position at which the stop line is detected. If it is determined that the vehicle 100 is already within the predefined time range or distance range, the detected stop line can be ignored within the scope of the driving function. On the other hand, the detected stop line can be taken into consideration within the scope of the driving function.

The vehicle guidance system 101 may be configured to determine a (possibly virtual) stop line for the vehicle 100 at the detected signaling unit 200, 210 by means of an alternative method (if the stop line detected on the basis of the environmental data is ignored). In particular, the vehicle 100 can be stopped behind the leading vehicle within the scope of follow-on travel (with the result that the vehicle 100 comes to a standstill at a particular target distance behind the leading vehicle).

Furthermore, the vehicle guidance system 101 may be configured to take the detected stop line into consideration during the deceleration process of the vehicle 100 (if the stop line detected on the basis of the environmental data is intended to be taken into consideration). For example, the vehicle 100 may be decelerated in an automated manner (taking the leading vehicle into consideration) in such a manner that the vehicle 100 comes to a standstill at the detected stop line (if this is possible taking the leading vehicle into consideration, in particular taking into consideration the required target distance from the leading vehicle). In other words, it is possible to effect automated deceleration of the vehicle 100 at the detected stop line, wherein the distance from the leading vehicle is also taken into consideration during the automated deceleration (in particular in order to avoid the vehicle driving too close to the leading vehicle).

The robustness and the comfort of the (UCC) driving function can be increased by possibly ignoring a stop line detected on the basis of the environmental data at a signaling unit 200, 210.

As already explained above, the vehicle guidance system 101 may be configured to detect an object located ahead, in particular the stop line of a signaling unit 200, 210, to which automated deceleration (until coming to a standstill) is intended to be effected. In this case, the object may be detected and in particular located on the basis of the environmental data from the one or more environmental sensors 103 of the vehicle 100 and/or on the basis of the map data relating to the road network used by the vehicle 100.

In particular, a signaling unit 200, 210 and an object (in particular a stop line) assigned to the signaling unit 200, 210 can be detected on the basis of the environmental data. Furthermore, the distance between the detected object and the vehicle can be determined on the basis of the environmental data (for example on the basis of a temporal sequence of images from a camera). However, the determination or estimation of the distance on the basis of the environmental data from a camera is typically relatively inaccurate, in particular in the case of relatively long distances.

The vehicle guidance system 101 may be configured to effect the automated longitudinal guidance of the vehicle 100 with respect to the object associated with the signaling unit 200, 210 located ahead on the basis of the determined distance. In particular, the automated deceleration of the vehicle 100 may be effected on the basis of the determined distance (in order to cause the vehicle 100 to come to a standstill at the position of the object). On account of the relatively high inaccuracy of the distance measurement, there may be fluctuations in the determined distance during the approach to the object. This may result in a fluctuating approach behavior of the vehicle 100 and therefore in reduced comfort for the user of the vehicle 100.

The vehicle guidance system 101 may be configured to determine the position of the detected object (for example the GPS coordinates) on the basis of the map data. The position of the detected object can be indicated, for example, by a map attribute of the signaling unit 200, 210. A map-based distance (also referred to as a map-data-based distance in this document) between the vehicle and the object can then be determined on the basis of the determined position of the object and on the basis of the current position of the vehicle 100. In this case, the map-based distance may be more accurate than the camera-based distance described above (which is also referred to as an environmental-data-based distance in this document), in particular in the case of relatively long distances.

The vehicle guidance system 101 may be configured to determine an estimated value of the distance between the vehicle 100 and the detected object (in particular the stop line) at the signaling unit 200, 210 located ahead on the basis of the map-based distance and on the basis of the camera-based distance. The estimated value of the distance may be determined in this case as a (possibly weighted) average value of the map-based distance and the camera-based distance. In this case, the weighting may be moved from the map-based distance to the camera-based distance with decreasing distance, in particular with decreasing estimated value of the distance.

An upstream analysis can therefore be used to assign a camera-based object (for example a traffic light, etc.) to an object in the map data, the distance of which is known from the map data. Fluctuations when determining the estimated value of the distance can be smoothed by means of weighted averaging of the camera-based and map-based distance. In this case, the weights may be dependent on the distance, with the result that the weight is shifted from completely map-based to completely camera-based during approach. In order to determine the estimated value of the distance from a detected signaling unit 200, 210 (in particular from the stop line of the signaling unit 200, 210), the distance from the assigned intersection and the camera-based distance can be linked to one another in a weighted manner.

Determining the estimated value of the distance on the basis of the environmental data and on the basis of the map data makes it possible to determine the estimated value in a stable manner while the vehicle 100 approaches a signaling unit 200, 210. The comfort and the safety of the driving function can therefore be increased.

As already explained above, the vehicle guidance system 101 may be configured to determine distance information relating to the temporal and/or spatial distance between the vehicle 100 and the signaling unit 200, 210 located ahead, in particular between the vehicle 100 and the stop line of the signaling unit 200, 210 located ahead. The distance information may be determined on the basis of the environmental data and/or on the basis of the map data.

The distance information may be taken into consideration during operation of the (UCC) driving function. In particular, the automated deceleration of the vehicle 100 may be carried out at the signaling unit 200, 210 located ahead (possibly repeatedly while the vehicle 100 approaches the signaling unit 200, 210) on the basis of the distance information currently determined in each case and adapted (possibly repeatedly while the vehicle 100 approaches the signaling unit 200, 210).

Furthermore, the vehicle guidance system 101 may be configured to check the presence of the signaling unit 200, 210 and/or to determine the signaling state (in particular the traffic light color) of the signaling unit 200, 210 on the basis of the environmental data (possibly repeatedly while the vehicle 100 approaches the signaling unit 200, 210).

While the vehicle 100 approaches the signaling unit 200, 210, there may be contradictions between the measured values at different times on account of the repeated evaluation of the environmental data (and possibly the map data). Alternatively or additionally, there may be a change in the signaling state of the signaling unit 200, 210 during approach. Such abrupt changes in the detected situation when approaching the signaling unit 200, 210 may result in abrupt (and possibly uncomfortable) changes in the driving behavior of the vehicle 100, in particular when the vehicle 100 is already relatively close to the signaling unit 200, 210.

The vehicle guidance system 101 may be configured to ignore the distance between the vehicle 100 and the (stop line of the) signaling unit 200, 210, as determined on the basis of the environmental data, and/or a detected change in the signaling state of the signaling unit 200, 210 during operation of the driving function at the signaling unit 200, 210 if the vehicle 100 is already at a spatial and/or temporal distance from the signaling unit 200, 210 which is equal to or less than a predefined (spatial and/or temporal) distance threshold value.

In particular, as of a distance corresponding to the distance threshold value, the distance may be determined possibly solely on the basis of the odometry of the vehicle 100 (for example the wheel speed of the vehicle 100). For example, it is possible to carry out automated deceleration of the vehicle 100 to that position of the stop line of the signaling unit 200, 210 which is valid at the time at which the distance of the vehicle 100 falls below the distance threshold value (for the first time).

Alternatively, as of a distance corresponding to the distance threshold value, a change in the signaling state (in particular a color change) of the signaling unit 200, 210 may possibly be ignored. In particular, deceleration to a standstill may possibly be continued even if the signaling unit 200, 210 changes to green or amber shortly before the vehicle 100 reaches the stop line of the signaling unit 200, 210.

Particularly comfortable, robust and safe operation of the driving function can be enabled by ignoring measured values relating to the distance and/or measured values relating to the signaling state which are determined on the basis of the environmental data as of a distance corresponding to the distance threshold value.

As already explained above, the vehicle guidance system 101 may be configured to operate the (UCC) driving function in an automatic mode or in a manual mode. In this case, a detected signaling unit 200, 210 located ahead is taken into consideration automatically in the automatic mode during the automated longitudinal guidance of the vehicle 100 at the detected signaling unit 200, 210. On the other hand, in the manual mode, there is a query to the driver of the vehicle 100 in order to determine whether or not the detected signaling unit 200, 210 is intended to be taken into consideration. By means of feedback to the vehicle guidance system 101, the driver can then decide and/or effect whether or not the detected signaling unit 200, 210 is taken into consideration.

The fact of whether the driving function is carried out in the automatic mode or only in the manual mode may depend on one or more properties of the signaling unit 200, 210, in particular on whether or not the signaling state of the signal generator 201 relevant to the direction of travel of the vehicle 100 can be clearly determined. If the signaling unit 200, 210, for example, has only a single signal group, the one or more signal generators 201 of which always have the same signaling state (as is indicated by the map data, for example), the driving function can be operated in the automatic mode. If, on the other hand, there is a lack of clarity as to whether the signaling state of a signal generator 201 (determined on the basis of the environmental data) is relevant to the direction of travel of the vehicle 100, only a manual mode of the driving function may possibly be effected.

The one or more standard rules, according to which the vehicle guidance system 101 decides whether the driving function is operated in the automatic mode or in the manual mode, may be known to the driver of the vehicle 100 or may have been learnt by the driver on the basis of the behavior of the driving function (thus resulting in a familiarization effect of the driver). This may result in the driver of the vehicle 100 expecting a particular behavior of the driving function, in particular a particular automatic behavior of the driving function, and becoming careless when monitoring the operation of the driving function (according to SAE level 2). This may result in a reduced driving safety.

The vehicle guidance system 101 may be configured to at least occasionally operate the driving function in an unusual manner for the driver in order to avoid the driver becoming accustomed to a defined behavior of the driving function and consequently becoming inattentive. The differing behavior of the driving function may be effected in this case at (pseudo-) randomly selected times, in particular at (pseudo-) randomly selected signaling units 200, 210. In particular, the vehicle guidance system 101 may be configured to (pseudo-) randomly select signaling units 200, 210 at which the driving function is operated in the manual mode even though it would be possible to operate the driving function in the automatic mode at the respective signaling unit 200, 210. A familiarization effect of the driver and an associated reduction in the driving safety can therefore be avoided.

As already explained above, a familiarization effect with respect to the automated form of the driving function cannot be excluded during mixed operation comprising an automatic and manual form of the function. By virtue of the fact that the form of the function which is possible in an automated manner per se is output as a manual offer at random times or in random driving situations, it is possible to prevent a familiarization effect from occurring for the driver, both in relation to the general behavior of the function (if the vehicle 100 is en route in an area with generally high availability) and in individual situations (which the driver usually always experiences as automated).

Within the scope of the UCC driving function, aUCC control is typically carried out at relatively simple traffic light intersections (with only a single signal group). Every x-th (for example every 20-th) control operation can then be manually offered (even though aUCC operation would be possible). In this case, the starting value of the counter can be randomly selected when the vehicle 100 is started in order to cause the driver to be regularly confronted with mUCC operation, but different signaling units 200, 210 (even for the same travel routes) are selected for a deviation from the standard behavior of the driving function.

It is therefore possible to effect mUCC operation in a temporally random manner at selected signaling units 200, 210 even though aUCC operation would be possible. The differing mUCC operation can be carried out, for example, on the basis of a counter (for example when the counter reaches a particular period value), wherein the counter can be initialized by means of a random number generator in order to cause random times at which the differing mUCC operation is carried out during a journey.

A familiarization effect of the driver of the vehicle 100 can therefore be reliably avoided.

Different aspects of the vehicle guidance system 101 described in this document are described below on the basis of methods. It should be pointed out that the different features of the different methods can be combined with one another in any desired manner.

FIG. 5*a* shows a flowchart of an exemplary (possibly computer-implemented) method 500 for providing a driving function (in particular the UCC driving function) for the automated longitudinal guidance of a vehicle 100.

During operation of the driving function, the method 500 comprises determining 501 data relating to a first signaling unit 200, 210 located ahead in the direction of travel of the vehicle 100. In particular, environmental data from one or more environmental sensors 103 of the vehicle 100 and/or map data relating to the road network used by the vehicle 100 can be determined as data.

Furthermore, the method 500 comprises operating 502 the driving function in an automatic mode or in a manual mode at the first signaling unit 200, 210 on the basis of the data relating to the signaling unit 200, 210. In this case, the first signaling unit 200, 210 can be taken into consideration possibly automatically in the automatic mode and possibly only after confirmation by a user of the vehicle 100 in the manual mode during the automated longitudinal guidance of the vehicle 100.

For example, the driving function may be operated in the automatic mode if the color of a signal group 201 of the signaling unit 200, 210 that is relevant to the direction of travel of the vehicle 100 can be clearly determined on the basis of the data. If the color of the relevant signal group 201 cannot be clearly determined, the manual mode may be used if appropriate. The automatic mode or the manual mode of the driving function can therefore be flexibly used on the basis of the available data for a signaling unit 200, 210. The availability and therefore the comfort of the driving function can be increased by flexibly changing between the automatic mode and the manual mode.

FIG. 5b shows a flowchart of an exemplary (possibly computer-implemented) method 510 for providing a driving function (in particular the UCC driving function) for the automated longitudinal guidance of a vehicle 100 at a signaling unit 200, 210.

During operation of the driving function, the method 510 comprises detecting 511 that a configuration change to a property of the driving function is effected by a user of the vehicle 100 at a configuration time or at a configuration position of the vehicle 100 (for example a change from the automatic mode to the manual mode or deactivation of the driving function).

The method 510 also comprises determining 512 that a first signaling unit 200, 210 located ahead in the direction of travel of the vehicle 100 has already been taken into consideration during the automated longitudinal guidance of the vehicle 100 at the configuration time or at the configuration position. The method 510 also comprises taking into consideration 513 the configuration change only for the signaling unit 200, 210, which follows the first signaling unit 200, 210, during the automated longitudinal guidance of the vehicle 100 and/or only after the automated longitudinal guidance of the vehicle 100 has been ended or completed at the first signaling unit 200, 210 (for example only after braking the vehicle 100 to a standstill at the first signaling unit 200, 210). The automated longitudinal guidance for the first signaling unit 200, 210 may also be effected in this case without taking the configuration change into consideration. Particularly safe operation of the driving function can therefore be enabled.

FIG. 5c shows a flowchart of an exemplary (possibly computer-implemented) method 520 for providing a driving function (in particular the UCC driving function) for the automated longitudinal guidance of a vehicle 100 at a signaling unit 200, 210.

During operation of the driving function, the method 520 comprises determining 521 environmental data relating to the environment of the vehicle 100 in front of the vehicle 100 in the direction of travel. In this case, the environmental data may have been captured by one or more environmental sensors 103 of the vehicle 100. The method 520 also comprises detecting 522, on the basis of the environmental data, a first signaling unit 200, 210 which is in front of the vehicle 100 in the direction of travel on the road used by the vehicle 100.

The method 520 also comprises determining 523 that there is a contradiction between the first signaling unit 200, 210 detected on the basis of the environmental data and the map data relating to the road network used by the vehicle 100. For example, it is possible to identify that the first signaling unit 200, 210 detected on the basis of the environmental data has a different (in particular higher) number of different signal groups 201 than recorded in the map data.

In response to the detected contradiction, the method 520 also comprises causing 524 an unavailability output, in particular an unavailability display, to the user of the vehicle 100 in order to inform the user that the first signaling unit 200, 210 detected on the basis of the environmental data is not taken into consideration in the driving function for the automated longitudinal guidance of the vehicle 100. The safety of the driving function can therefore be increased further.

FIG. 5d shows a flowchart of an exemplary (possibly computer-implemented) method 530 for providing a driving function (in particular the UCC driving function) for the automated longitudinal guidance of a vehicle 100 at a signaling unit 200, 210.

During operation of the driving function, the method 530 comprises determining 531 environmental data relating to the environment of the vehicle 100 in front of the vehicle 100 in the direction of travel. The method 530 also comprises detecting 532, on the basis of the environmental data, a first signaling unit 200, 210 which is arranged in front of the vehicle 100 in the direction of travel on the road used by the vehicle 100.

The method 530 also comprises determining 533 distance information relating to the temporal and/or spatial distance 311 of the vehicle 100 to the first signaling unit 200, 210. The method 530 also comprises causing or suppressing 534 an output of information relating to the first signaling unit 200, 210 on the basis of the distance information. In particular, the output (in particular an offer for the automated longitudinal guidance at the first signaling unit 200, 210) can be suppressed if the vehicle 100 is still too far away from the first signaling unit 200, 210. Alternatively or additionally, an output (in particular an unavailability output) can be suppressed if the vehicle 100 is already too close to the first signaling unit 200, 210. The relevance of the output and therefore the comfort of the driving function can therefore be increased.

Figure 5E:
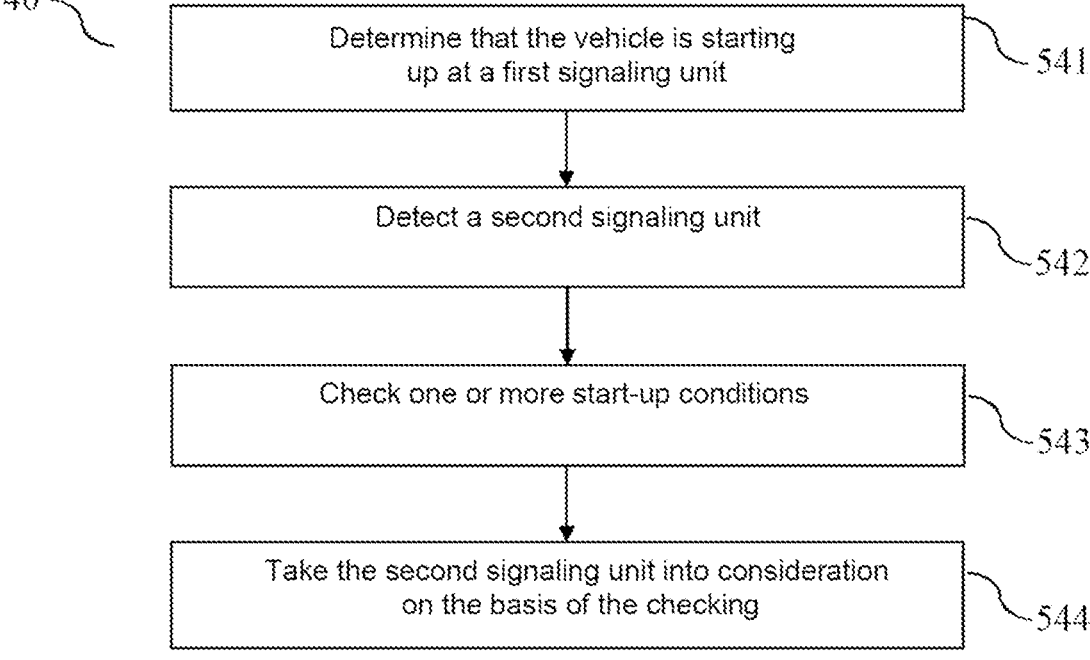

FIG. 5e shows a flowchart of an exemplary (possibly computer-implemented) method 540 for providing a driving function (in particular the UCC driving function) for the automated longitudinal guidance of a vehicle 100 at a signaling unit 200, 210.

During operation of the driving function, the method 540 comprises determining 541 that the vehicle 100 carries out a start-up process at a first signaling unit 200, 210. The method 540 also comprises detecting 542, on the basis of the environmental data from one or more environmental sensors 103 of the vehicle 100, a second signaling unit 200, 210 which follows the first signaling unit 200, 210 and is arranged in front of the vehicle 100 in the direction of travel on the road used by the vehicle 100.

The method 540 also comprises checking 543 whether or not one or more start-up process conditions with respect to the start-up process are met (for example one or more start-up process conditions with respect to the driving speed of the vehicle 100 and/or with respect to the temporal or spatial distance of the vehicle 100 from the first signaling unit 200, 210).

The method 540 also comprises taking into consideration 544 the second signaling unit 200, 210 during the automated longitudinal guidance of the vehicle 100 on the basis of whether or not the one or more start-up process conditions are met. In particular, a second signaling unit 200, 210 which is detected in the immediate temporal or spatial vicinity of the first signaling unit 200, 210 may not be taken into consideration in this case. The reliability and the comfort of the driving function can therefore be increased (for example since the output of incorrectly detected signaling units 200, 210 is avoided).

FIG. 5f shows a flowchart of an exemplary (possibly computer-implemented) method 550 for providing a driving function (in particular the UCC driving function) for the automated longitudinal guidance of a vehicle 100 at a signaling unit 200, 210.

During operation of the driving function, the method 550 comprises detecting 551, on the basis of the environmental data from one or more environmental sensors 103 of the vehicle 100, a first signaling unit 200, 210 which is arranged in front of the vehicle 100 in the direction of travel on the road used by the vehicle 100. The method 550 also comprises determining 552 driver data relating to the attentiveness of the driver of the vehicle 100 when monitoring the driving function. The method 550 also comprises operating 553 the driving function with respect to the automated longitudinal guidance of the vehicle 100 at the first signaling unit 200, 210 on the basis of the driver data. In particular, the driving function may be operated in the automatic mode or in the manual mode on the basis of the driver data. The safety and/or the comfort of the driving function can therefore be increased.

FIG. 5*g* shows a flowchart of an exemplary (possibly computer-implemented) method 560 for providing a driving function (in particular the UCC driving function) for the automated longitudinal guidance of a vehicle 100 at a signaling unit 200, 210.

During operation of the driving function, the method 560 comprises detecting 561 a first signaling unit 200, 210 which is arranged in front of the vehicle 100 in the direction of travel on the road used by the vehicle 100. The method 560 also comprises determining 562 stopping information relating to the expected stopping period of the vehicle 100 at the first signaling unit 200, 210 and/or relating to the type of the first signaling unit 200, 210 (and the associated expecting stopping period).

The method 560 also comprises causing 563 automated deceleration of the vehicle 100 at the first signaling unit 200, 210 on the basis of the stopping information. In particular, the temporal profile of the deceleration can be adapted on the basis of the stopping information. The comfort and/or the safety of the driving function can therefore be increased.

FIG. 5*h* shows a flowchart of an exemplary (possibly computer-implemented) method 570 for providing a driving function (in particular the UCC driving function) for the automated longitudinal guidance of a vehicle 100 at a signaling unit 200, 210. During operation of the driving function, the method 570 comprises determining 571 that the vehicle 100 is at a signaling unit 200, 210 (in particular at a red traffic light). The method 570 also comprises detecting 572 that the driver of the vehicle 100 actuates an operating element 411, 412, 413 (in particular a button or a rocker) of the user interface 107 of the vehicle 100 in order to control the driving function. The method 570 also comprises causing 573 automated starting-up of the vehicle 100 in response to the detected actuation of the operating element 411, 412, 413. It is therefore possible to enable comfortable and safe starting-up at a signaling unit 200, 210.

FIG. 5*i* shows a flowchart of an exemplary (possibly computer-implemented) method 580 for providing a driving function (in particular the UCC driving function) for the automated longitudinal guidance of a vehicle 100 at a signaling unit 200, 210.

During operation of the driving function, the method 580 comprises determining 581, on the basis of environmental data relating to a leading vehicle driving (possibly directly) in front of the vehicle 100, that the leading vehicle drives through a traffic junction (in particular an intersection)

associated with a signaling unit 200, 210. In this case, the leading vehicle may be arranged in the same lane as the vehicle 100.

In response to the detected driving of the leading vehicle, the method 580 also comprises causing 582 the vehicle 100 to be guided in an automated manner behind the leading vehicle across the traffic junction even if the state of the signaling unit 200, 210 (in particular the color of the relevant signal group 201) cannot be clearly determined with respect to the permission for driving through the traffic junction. The availability and therefore the comfort of the driving function can be increased by taking the behavior of the leading vehicle into consideration.

FIG. 5*j* shows a flowchart of an exemplary (possibly computer-implemented) method 590 for providing a driving function (in particular the UCC driving function) for the automated longitudinal guidance of a vehicle 100 at a signaling unit 200, 210.

During operation of the driving function, the method 590 comprises detecting 591 that the accelerator pedal of the vehicle 100 is actuated. The method 590 also comprises determining 592 actuation information relating to the actuation of the accelerator pedal and/or relating to a reaction of the vehicle 100 that is caused by the actuation of the accelerator pedal. The method 590 also comprises adapting 593, in particular continuing or aborting, the operation of the driving function on the basis of the actuation information. In this case, in particular, the actuation of the accelerator pedal selectively (for each signaling unit 200, 210) may mean that a detected signaling unit 200, 210 located ahead is not taken into consideration during the automated longitudinal guidance of the vehicle 100 (and the vehicle 100 is therefore guided past the detected signaling unit 200, 210 with distance and/or speed control, in particular using the ACC driving function). The availability and the comfort of the driving function can be safely increased by taking actuation information into consideration. In particular, the driving function can thus be comfortably overwritten (selectively for each signaling unit 200, 210).

FIG. 6*a* shows a flowchart of a further exemplary (possibly computer-implemented) method 600 for providing a driving function for the automated longitudinal guidance of a vehicle 100 at a signaling unit 200, 210. The method 600 comprises determining 601 environmental information relating to the environment of a first signaling unit 200, 210 located ahead in the direction of travel of the vehicle 100. The environmental information may comprise, in particular, information relating to the street network in the environment of the first signaling unit 200, 210 and/or information relating to the junction associated with the first signaling unit 200, 210.

The method 600 also comprises operating 602 the driving function for the automated longitudinal guidance of the vehicle 100 at the first signaling unit 200, 210 on the basis of the environmental information. In this case, the degree of automation of the driving function, in particular, can be adapted on the basis of the environmental information. The driving function may be operated in the manual mode or in the automatic mode at the first signaling unit 200, 210, for example on the basis of the environmental information.

The comfort and the availability of the driving function can be increased by taking environmental information into consideration, in particular environmental information relating to the complexity of the street network and/or of the junction in the environment of the first signaling unit 200, 210, when operating the driving function.

FIG. 6b shows a flowchart of a further exemplary (possibly computer-implemented) method 610 for providing a driving function for the automated longitudinal guidance of a vehicle 100 at a signaling unit 200, 210. The method 610 comprises causing 611 the vehicle 100 to carry out follow-on travel behind a leading vehicle at a first signaling unit 200, 210. A distance and/or speed of the vehicle 100 can be controlled during the follow-on travel.

The method 610 also comprises detecting 612 a stop line at the first signaling unit 200, 210 on the basis of environmental data from one or more environmental sensors 103 (in particular on the basis of the image data from at least one camera) of the vehicle 100. The method 610 also comprises determining 613 distance information relating to the temporal and/or spatial distance 311 of the vehicle 100 from the first signaling unit 200, 210 and/or from the detected stop line of the first signaling unit 200, 210. The distance information may be determined, for example, on the basis of the environmental data and/or on the basis of the map data.

The method 610 also comprises taking into consideration or not taking into consideration 614 the detected stop line during the automated longitudinal guidance of the vehicle 100 at the first signaling unit 200, 210 on the basis of the distance information. The comfort and the safety of the driving function can therefore be increased.

FIG. 6c shows a flowchart of a further exemplary (possibly computer-implemented) method 620 for providing a driving function for the automated longitudinal guidance of a vehicle 100 at a signaling unit 200, 210.

The method 620 comprises determining 621 an environmental-data-based distance from a first signaling unit 200, 210 located ahead on the basis of environmental data from one or more environmental sensors 103 of the vehicle 100. The environmental-data-based distance may be determined, in particular, on the basis of the image data from at least one camera of the vehicle 100 (for example on the basis of a temporal sequence of images from the camera).

The method 620 also comprises determining 622 a map-data-based distance from the first signaling unit 200, 210 located ahead on the basis of map data relating to the road network used by the vehicle 100. The map-data-based distance may be determined, for example, from the spatial distance between the position of the (stop line of the) first signaling unit 200, 210, as indicated in the map data, and the position of the vehicle 100 (measured using a position sensor, in particular a GPS receiver, of the vehicle 100).

The method 620 also comprises determining 623 an estimated value of the distance from the first signaling unit 200, 210 on the basis of the environmental-data-based distance and on the basis of the map-data-based distance, in particular as a weighted average value of the environmental-data-based distance and the map-data-based distance. In this case, the weighting may be changed with increasing proximity of the vehicle to the first signaling unit 200, 210 (in particular moved from the map-data-based distance to the environmental-data-based distance).

The method 620 also comprises effecting 624 the automated longitudinal guidance (in particular the automated deceleration) of the vehicle 100 at the first signaling unit 200, 210 on the basis of the estimated value of the distance from the first signaling unit 200, 210. A comfortable and safe approach, in particular deceleration, of the vehicle 100 to the first signaling unit 200, 210 can be effected by taking the map-data-based distance and the environmental-data-based distance into consideration when determining the estimated value of the distance.

Figures 6D, 6E:
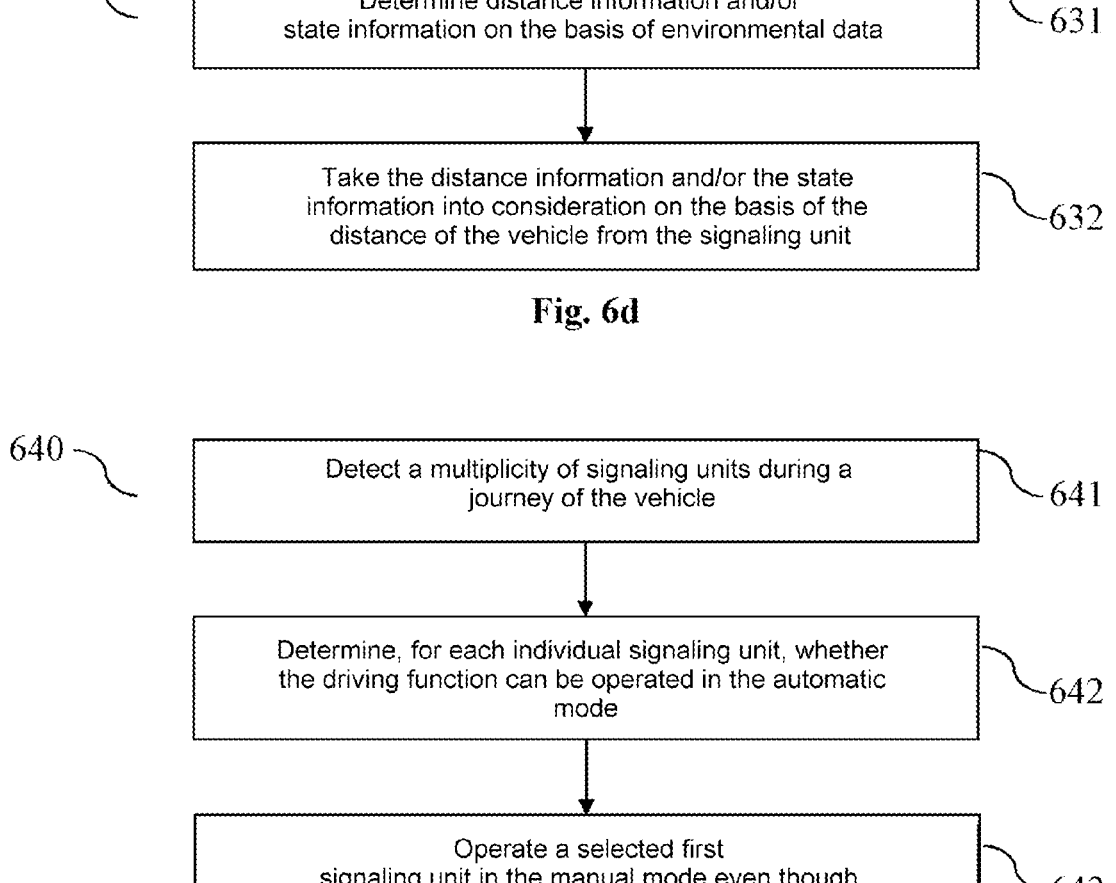

FIG. 6d shows a flowchart of a further exemplary (possibly computer-implemented) method 630 for providing a driving function for the automated longitudinal guidance of a vehicle 100 at a signaling unit 200, 210. The method 630 comprises the following steps which are carried out repeatedly, in each case at a time from a sequence of successive times. In particular, the method 630 comprises determining 631, on the basis of environmental data from one or more environmental sensors 103 of the vehicle 100 (in particular on the basis of the image data from a camera), distance information relating to a spatial and/or temporal distance 311 of the vehicle 100 from a first signaling unit 200, 210 located ahead and/or state information relating to a signaling state of the first signaling unit 200, 210.

The method 630 also comprises taking into consideration or not taking into consideration 632 the distance information and/or the state information during the automated longitudinal guidance of the vehicle 100 (in particular when carrying out automated deceleration) at the first signaling unit 200, 210 on the basis of an estimated value of the spatial and/or temporal distance 311 of the vehicle 100 from the first signaling unit 200, 210. In this case, the estimated value of the spatial and/or temporal distance 311 may be determined as described in connection with the method 620, for example.

During the method 630, the distance information and/or the state information may be taken into consideration during the automated longitudinal guidance of the vehicle 100 as long as the estimated value of the spatial and/or temporal distance 311 is greater than a distance threshold value. On the other hand, the distance information and/or the state information may not be taken into consideration or may be ignored during the automated longitudinal guidance of the vehicle 100 as soon as the estimated value of the spatial and/or temporal distance 311 is equal to or less than the distance threshold value. The distance threshold value may be, for example, between 5 m and 20 m and between 0.5 s and 2 s.

The comfort, the robustness and the safety of the driving function can be increased by selectively taking the distance information and/or the state information into consideration on the basis of the distance 311.

FIG. 6e shows a flowchart of a further exemplary (possibly computer-implemented) method 640 for providing a driving function for the automated longitudinal guidance of a vehicle 100 at a signaling unit 200, 210, wherein the driving function has an automatic mode and a manual mode.

The method 640 comprises detecting 641 a multiplicity of signaling units 200, 210 sequentially during a journey of the vehicle 100. In other words, signaling units 200, 210 may be sequentially detected on a journey of the vehicle 100 and may possibly be taken into consideration during the automated longitudinal guidance of the vehicle 100.

The method 640 also comprises determining 642, for each of the multiplicity of signaling units 200, 210, on the basis of data relating to the respective signaling unit 200, 210 (in particular on the basis of the environmental data and/or the map data), whether the driving function can be operated in the automatic mode or only in the manual mode at the respective signaling unit 200, 210. In particular, it is possible to (provisionally) decide, for each individual signaling unit 200, 210, whether the driving function may or is intended to be operated in the automatic mode or in the manual mode.

The method 640 also comprises operating 643 the driving function in the manual mode at at least a first signaling unit 200, 210 from the multiplicity of signaling units 200, 210, even though it was determined, on the basis of the data relating to the first signaling unit 200, 210, that the first signaling unit 200, 210 can be operated in the automatic mode. It is possible, in particular, to select (possibly randomly or at least partially randomly, possibly repeatedly and/or periodically) a first signaling unit 200, 210 at which the driving function is operated in the manual mode (in a manner differing from the usual or typical standard behavior of the driving function), even though the driving function could be operated in the automatic mode (and should be operated in the automatic mode according to the usual or typical standard behavior of the driving function). A familiarization effect of the driver of the vehicle 100 can therefore be reliably avoided and the attentiveness of the driver when monitoring the driving function can thereby be increased.

This document describes different aspects of an Urban Cruise Control (UCC) driving function which provides comfortable and safe automated longitudinal guidance (according to SAE level 2) while taking signaling units 200, 210 into consideration.

The present invention is not restricted to the exemplary embodiments shown. In particular, it should be noted that the description and the figures are intended to illustrate only the principle of the proposed methods, apparatuses and systems.

The invention claimed is:

1. A vehicle system for providing a driving function that provides automated longitudinal guidance of a vehicle at a signaling unit, wherein the driving function has an automatic mode, in which the signaling unit is automatically considered by the driving function, and a manual mode, in which the signaling unit is considered by the driving function only after a user confirmation, the vehicle system comprising:
   a vehicle guidance system configured to:
   sequentially detect a multiplicity of signaling units;
   for each signaling unit of the multiplicity of signaling units:
      determine whether the driving function is operable in the automatic mode or only in the manual mode at the signaling unit, wherein the determination is based on data relating to the signaling unit;
      as a default operation of the driving function, in response to determining that the driving function is operable in the automatic mode at the signaling unit, operate the driving function in the automatic mode at the signaling unit; and
      in contravention of the default operation, in response to determining that the driving function is operable in the automatic mode at the signaling unit, operate the driving function in the manual mode at the signaling unit so that the signaling unit is considered by the driving function only after the user confirmation.

2. The vehicle system according to claim 1, wherein the vehicle guidance system is configured to:
   pseudo-randomly select the signaling unit; and/or
   select the signaling unit using a random number generator.

3. The vehicle system according to claim 1,
   wherein the vehicle guidance system is configured to:
      change a counter at each signaling unit from the multiplicity of signaling units at which the driving function is operated in the automatic mode;
      select the signaling unit on the basis of a value of the counter such that the signaling unit for which the counter corresponds to a period value or to a multiple of the period value is selected, and wherein the period value is 10 or more.

4. The vehicle system according to claim 3, wherein the vehicle guidance system is configured to:
   reset the counter if the counter has reached the period value; and/or
   determine a starting value of the counter at a beginning of the journey of the vehicle using a random number generator.

5. The vehicle system according to claim 1, wherein the vehicle guidance system is configured to:
   select the signaling unit from the multiplicity of signaling units in such a manner that, on average, the driving function is nevertheless operated in the manual mode at X % of the signaling units, for which it is determined, on the basis of the data, that the driving function is operable in the automatic mode; and
   X is 4 or more.

6. The vehicle system according to claim 1, wherein the vehicle guidance system is configured to:
   take a signaling unit into consideration automatically in the automatic mode during the automated longitudinal guidance of the vehicle at the signaling unit; and
   take a signaling unit into consideration in the manual mode only after confirmation by a user of the vehicle during the automated longitudinal guidance of the vehicle at the signaling unit.

7. The vehicle system according to claim 1, wherein the vehicle guidance system is configured to:
   determine, as data relating to a signaling unit,
      (i) map data relating to signaling units in a road network used by the vehicle; and/or
      (ii) environmental data relating to the signaling unit which have been captured by one or more environmental sensors of the vehicle.

8. The vehicle system according to claim 7, wherein
   the map data comprise one or more attributes for the signaling unit; and
   the one or more attributes indicate:
      (i) a type of the signaling unit; and/or
      (ii) a number of different signal groups of the signaling unit for different directions of travel at a junction of the road network at which the signaling unit is arranged.

9. The vehicle system according to claim 8, wherein the type of signaling unit is whether the signaling unit is a light signal installation or a traffic sign.

10. The vehicle system according to claim 1, wherein the vehicle guidance system is configured to:
   determine a number of different signal groups of the signaling unit on the basis of the data relating to a signaling unit from the multiplicity of signaling units; and
   determine, on the basis of the number of different signal groups, whether the driving function is operable in the automatic mode or only in the manual mode at the signaling unit.

11. The vehicle system according to claim 1, wherein the vehicle guidance system in the manual mode is configured to:
   output an offer relating to consideration of the signaling unit to the user of the vehicle, via a user interface of the vehicle; and
   take the signaling unit into consideration during the automated longitudinal guidance of the vehicle at the signaling unit if the offer is accepted by the user; and/or
   not take the signaling unit into consideration during the automated longitudinal guidance of the vehicle at the signaling unit if the offer is not accepted by the user.

12. The vehicle system according to claim 1, wherein, when a signaling unit is taken into consideration during the automated longitudinal guidance of the vehicle, the vehicle guidance system is configured to:

determine whether or not the vehicle must stop at the signaling unit on the basis of the data relating to the signaling unit; and cause the vehicle to be stopped in an automated manner at the signaling unit if it is determined that the vehicle must stop at the signaling unit; and/or cause the vehicle to be longitudinally guided in an automated manner past the signaling unit if it is determined that the vehicle need not stop at the signaling unit.

13. The vehicle system according to claim 12, wherein the data relating to the signaling unit is a color of a light signal from the signaling unit.

14. A method for operating a driving function that provides automated longitudinal guidance of a vehicle at a signaling unit, wherein the driving function has an automatic mode, in which the signaling unit is automatically considered by the driving function, and a manual mode, in which the signaling unit is considered by the driving function only after a user confirmation, the vehicle system, the method comprising:

detecting a multiplicity of signaling units sequentially;

for each signaling unit of the multiplicity of signaling units:

determine whether the driving function is operable in the automatic mode or only in the manual mode at the signaling unit, wherein the determination is based on data relating to the signaling unit;

as a default operation of the driving function, in response to determining that the driving function is operable in the automatic mode at the signaling unit, operating the driving function in the automatic mode at the signaling unit; and in contravention of the default operation, in response to determining that the driving function is operable in the automatic mode at the signaling unit, operating the driving function in the manual mode at the signaling unit so that the signaling unit is considered by the driving function only after the user confirmation.

* * * * *